United States Patent
Boyer et al.

(10) Patent No.: US 10,126,756 B2
(45) Date of Patent: Nov. 13, 2018

(54) METHOD OF ADAPTING A SEGMENT OF AN AIRCRAFT TRAJECTORY WITH CONSTANT GROUND GRADIENT SEGMENT ACCORDING TO AT LEAST ONE PERFORMANCE CRITERION

(71) Applicant: THALES, Courbevoie (FR)

(72) Inventors: Johan Boyer, Toulouse (FR); Rémy Auletto, Toulouse (FR); Norbert Baloche, Labastidette (FR)

(73) Assignee: THALES, Courbevoie (FR)

( * ) Notice: Subject to any disclaimer, the term of this patent is extended or adjusted under 35 U.S.C. 154(b) by 61 days.

(21) Appl. No.: 14/861,610

(22) Filed: Sep. 22, 2015

(65) Prior Publication Data
US 2016/0085239 A1    Mar. 24, 2016

(30) Foreign Application Priority Data
Sep. 22, 2014 (FR) ..................... 14 02108

(51) Int. Cl.
| G05D 1/04 | (2006.01) |
| G01C 21/00 | (2006.01) |
| G05D 1/06 | (2006.01) |
| G01C 23/00 | (2006.01) |
| G08G 5/02 | (2006.01) |
| G08G 5/00 | (2006.01) |

(52) U.S. Cl.
CPC ............ *G05D 1/042* (2013.01); *G01C 21/00* (2013.01); *G01C 23/00* (2013.01); *G05D 1/0676* (2013.01); *G08G 5/0021* (2013.01); *G08G 5/025* (2013.01); *Y02T 50/84* (2013.01)

(58) Field of Classification Search
None
See application file for complete search history.

(56) References Cited

U.S. PATENT DOCUMENTS

| 9,423,799 B1 * | 8/2016 | Wu ..................... G05D 1/042 |
| 2003/0193410 A1 * | 10/2003 | Chen .................. G01C 23/005 340/971 |

(Continued)

FOREIGN PATENT DOCUMENTS

| FR | 2 915 304 A1 | 10/2008 |
| FR | 2 949 577 A1 | 3/2011 |

*Primary Examiner* — Nicholas K Wiltey
(74) *Attorney, Agent, or Firm* — Baker & Hostetler LLP

(57) ABSTRACT

A method for adapting an aircraft constant-gradient descent segment comprises: an acquisition step in which state variables characterizing the aircraft, environment variables characterizing the environment thereof and path variables characterizing the predicted path thereof at one of the initial and final points of the segment are acquired; a calculation step whereby a limit ground gradient for at least one performance criterion is calculated from the state variables, environment variables and path variables; a validity verification step checking the validity of the path initially predicted against the most restrictive limit ground gradient; and when the path initially predicted is not valid: a feasibility verification step checking the feasibility of a command to modify at least one state variable; if feasibility is verified, a prediction of executing the command; otherwise, a prediction of modifying one of the initial and final points of the segment with respect to constraints of the flight plan.

9 Claims, 12 Drawing Sheets

(56) References Cited

U.S. PATENT DOCUMENTS

| | | | |
|---|---|---|---|
| 2007/0057114 A1* | 3/2007 | Boissenin | B64C 9/20 244/75.1 |
| 2008/0262665 A1 | 10/2008 | Coulmeau et al. | |
| 2011/0077858 A1 | 3/2011 | Coulmeau et al. | |
| 2013/0204470 A1* | 8/2013 | Luckner | G08G 5/025 701/18 |

* cited by examiner

METHOD OF ADAPTING A SEGMENT OF AN AIRCRAFT TRAJECTORY WITH CONSTANT GROUND GRADIENT SEGMENT ACCORDING TO AT LEAST ONE PERFORMANCE CRITERION

CROSS-REFERENCE TO RELATED APPLICATION

This application claims priority to foreign French patent application No. FR 1402108, filed on Sep. 22, 2014, the disclosure of which is incorporated by reference in its entirety.

FIELD OF THE INVENTION

The present invention relates to the calculation and prediction of aircraft flight paths. More specifically, it relates to the constructing and adapting of constant-gradient predicted flight path segments, particularly in the context of descent approach procedures.

BACKGROUND

Aircraft approach and descent procedures are nowadays used to determine the reference path and guide the aircraft between cruising flight and landing. In the context of civil aviation, an approach procedure involves determining a horizontal flight profile, time and altitude constraints associated with the various waypoints of this horizontal path, and determining an associated vertical profile.

The horizontal profile is generally established according to procedures that are specific to each airport, using navigation databases. Thus, the aircraft has to overfly successively navigation points or beacons in a predetermined order in order to reach the runway for landing. In the context of the predefined approach procedures, each of these points is generally associated with one or more constraints, simultaneously relating to time, altitude, gradient or speed. These constraints are extremely important to air traffic control because they make it possible to ensure that approaching aircrafts will descend progressively until they land, while at the same time maintaining enough of a distance or separation from one another that safety is not compromised.

The descent procedures notably use the following altitude constraints: "AT" indicates that the aircraft must overfly a navigation point at a precise altitude; "AT OR ABOVE" indicates that the aircraft must overfly a navigation point at an altitude at least equal to the given altitude; "AT OR BELOW" indicates that the aircraft must overfly a navigation point at an altitude at most equal to the given altitude; "WINDOW" indicates that the aircraft must overfly the navigation point at an altitude that falls within a window arranged between a minimum altitude and a maximum altitude.

Once the navigation points and associated constraints are known, the Flight Management System, commonly known by its acronym FMS, determines a vertical profile that allows each of the navigation points to be validated with the associated time and altitude constraints while at the same time complying with the aircraft flight envelope and decelerating gradually until the aircraft lands.

The method generally adopted in the prior art is a descent referred to as a "stepped descent". Such a descent consists, as soon as an altitude constraint is reached, in beginning a descent phase to arrive at the next altitude constraint even before the associated navigation point, then flying "level" (at constant altitude) as far as this point, then beginning a new phase of descent followed by level flight, and so on, right up to the final approach. The aircraft therefore uses the level phases to decelerate and "apply configuration" which means to say adapt its aerodynamic configuration, for example by deploying the slats, flaps and landing gears, in order progressively to increase its capacity to decelerate and its lift at low speed.

Stepped descent procedures have the advantage of making it easier to calculate the vertical path, by separating the descent phases from the deceleration phases which are performed during level flight. However, the vertical path produced using these procedures is suboptimal. This is because stepped descent causes the aircraft to fly as low as possible with respect to the altitude constraints to which it is subject. Stepped descents have major disadvantages: firstly, the aircraft fuel consumption is higher at low altitude; secondly the noise generated by the engines and the flow of air around the aircraft (aerodynamic noise) is produced closer to the ground, in zones near the airports which are often densely populated. In addition, in this type of descent, the aircraft decelerates earlier than is necessary and therefore flies at low speed for longer. It is therefore obliged, in order to maintain lift, to switch to a high-lift configuration, namely to fly with the slats and flaps deployed. This type of configuration increases aerodynamic drag and thus necessitates an increase in engine thrust, and therefore in fuel consumption. Thus, stepped descents increase both aircraft fuel consumption and noise pollution associated with the approach of the aircraft.

In order to alleviate these disadvantages, flight procedures known as "CDA" (Continuous Descent Approach), "CDO" (Continuous Descent Operations) or even "OPD" (Optimized Profile Descent) propose the construction of segment flight segments within level segments for the approach procedures. This notably allows the aircraft to fly higher with minimal thrust, while at the same time delaying the application of an aerodynamic configuration, namely deployment of aerodynamic elements that improve low-speed lift but increase aircraft drag and aerodynamic noise at a given speed, thereby decreasing the amount of time spent flying in high-lift configuration. The flight segments of a flight procedure of the type referred to as CDA may notably be performed in "FPA/SPEED" mode, which means to say with an FPA (Flight Path Angle) that is constant. Descent procedures referred to as CDA are notably described in patent U.S. Pat. No. 8,126,599.

However, too simple a construction of optimized flight segments may lead to paths that are unflyable. Specifically, flying as high as possible may lead to the need ultimately to descend at too steep a gradient. This may occur in unforeseen circumstances (for example if a tail wind is a few knots higher than was initially laid down) or quite simply if the angle of descent has been calculated to obtain a profile which is highly optimized for consumption but is not flyable, for example if there is a discrepancy between the actual performance of the aircraft and the model thereof. In such cases, the aircraft may fail to have sufficient capacity to decelerate to be able to meet the constraints of the flight plan without leaving its flight envelope. The pilot may then find himself forced to use the air brakes, rendering the approach suboptimal or may even find himself having to reapply the throttle belatedly, with disastrous consequences in terms of timing of the landing, fuel consumption and noise pollution and therefore cost for the airline.

One solution is to apply safety margins during the construction of the constant ground gradient path, for each element that may have an impact on the descent, for example applying a margin with respect to the possible change in tail wind, a margin with respect to the capacity of the aircraft to decelerate, etc. In order to hold all of these margins, the FMS will need to calculate anticipated moments for applying configuration so as to have a capacity of deceleration sufficient to hold all these margins. This application of configuration increasing the drag of the aircraft, it will therefore be necessary to increase the engine thrust, which will increase both fuel consumption and approach noise.

It is one object of the present invention to obtain a vertical path for approaches of CDA type which is as optimized as possible in terms of fuel consumption and therefore $CO_2$ emissions, flight time and noise pollution, while still remaining flyable with respect to the aerodynamic capacity of the aircraft and a set of performance and safety criteria and the margins associated therewith.

SUMMARY OF THE INVENTION

To this end, one subject of the invention is a method for adapting an aircraft descent segment with constant ground gradient, comprising acquiring state variables characterizing the aircraft, environment variables characterizing the environment thereof and path variables characterizing the predicted path thereof at one of the initial and final points of the segment; calculating a limit ground gradient for at least one performance criterion from state variables, environment variables and path variables; validity step of validating the path initially predicted against the most restrictive limit ground gradient; and when the path initially predicted is not valid: checking the feasibility of a command to modify at least one state variable; if feasibility is verified, predicting the execution of the said command; otherwise, predicting a modification of one of the initial and final points of the segment with respect to constraints of the flight plan.

Advantageously, the step of calculating a limit ground gradient for at least one performance criterion comprises calculating a limit air gradient for the said at least one performance criterion.

In one set of embodiments of the invention, the step of calculating the limit air gradient comprises at least: calculating an engine thrust resultant; setting the limit air gradient to a default value; calculating an aerodynamic drag resultant as a function of the limit air gradient and the state variables of the aircraft; calculating the limit air gradient as a function of the aerodynamic drag resultant, the aircraft state variables and the engine thrust resultant.

Advantageously, the step of calculating the aerodynamic drag resultant and the step of calculating the limit air gradient are performed iteratively until a stop criterion is satisfied.

Advantageously, the stop criterion is satisfied when the air gradients obtained in two successive iterations exhibit an angular difference which, in absolute value, is below a predefined threshold.

Advantageously, the predefined threshold has a value small enough to guarantee the convergence of the algorithm.

In one set of embodiments of the invention, the method comprises at least one performance criterion in relation to the deceleration capacity of the aircraft.

Advantageously, the step of checking the feasibility of a command to modify at least one state variable involves successively verifying a feasibility of one or more commands of an actuator for modifying a capacity of the aircraft to dissipate a total or a mechanical energy of the aircraft.

Advantageously, it comprises successively verifying: a command to reduce an engine thrust; a command to extend slats and flaps; a command to deploy a landing gear; a command to extend air brakes.

Advantageously, the method comprises a step of presenting the obtained vertical path to the pilot.

Advantageously, the method according to the invention comprises, when the flight plan constraints do not permit the modification of any of the initial and final points of the segment, displaying or emitting a cockpit warning.

Another subject of the invention is an aircraft flight management computing device configured to adapt a constant slope descent flight segment, comprising: a data link configured to acquire state variables characterizing the aircraft, environment variables characterizing the environment thereof and path variables characterizing the predicted path thereof at one of the initial and final points of the segment; a processor configured to calculate a limit ground gradient for at least one performance criterion from the said state variables, the said environment variables and the said path variables; validate the path initially predicted against the most restrictive limit ground gradient; and when the path initially predicted is not valid: check the feasibility of a command to modify at least one state variable; if feasibility is verified, predict the execution of the said command; otherwise, predict the modification of one of the initial and final points of the segment with respect to constraints of the flight plan.

Another subject of the invention is a computer program stored on a non transient computer readable medium, configured to adapt an aircraft flight segment with constant ground gradient, the said program comprising: computer code elements configured to carry out an acquisition of state variables characterizing the aircraft, of environment variables characterizing the environment thereof, and of path variables characterizing the predicted path thereof at one of the initial and final points of the segment; computer code elements configured to perform a calculation using the said state variables, the said environment variables and the said path variable of a limit ground gradient for at least one performance criterion; computer code elements configured to verify the validity of the path initially predicted with respect to the most restrictive limit ground gradient; computer code elements configured to perform the following operations when the path initially predicted is not valid: check the feasibility of a command to modify at least one state variable; if feasibility is verified, predict execution of the said command; otherwise, predict a modification of one of the initial and final points of the segment, with respect to constraints of the flight plan.

The method according to the invention makes it possible to determine vertical descent and approach paths while at the same time guaranteeing that the said paths remain flyable according to a set of criteria.

The method according to the invention makes it possible to determine vertical approach paths that have been optimized in terms of fuel consumption, flight time and noise caused by the path.

The method according to the invention allows a great deal of flexibility in determining the performance criteria and associated margins.

The method according to the invention allows a set of safety margins to be applied to a set of performance margins, guaranteeing all of these margins without, however, adding them together.

The present invention can be implemented in a flight management device of the FMS type, but may also be implemented in aircraft flight management devices positioned on the ground, in air traffic control systems, flight management systems belonging to airlines, or any other system for determining constant-gradient flight plan segments.

A method according to the invention allows margins of safety to be applied via a set of performance criteria and allows the segment to be adapted to the most restrictive margin and the most restrictive criterion. This makes it possible to obtain paths that are better optimized than in the prior art, in which the margins associated with each of the criteria are added together systematically without for example taking account of the true uncertainty regarding atmospheric conditions.

In certain embodiments, a method according to the invention allows the aerodynamic performance databases according to the prior art to be put to best use by calculating a limit air gradient as a function of an aerodynamic drag resultant and doing so iteratively.

BRIEF DESCRIPTION OF THE DRAWINGS

Other features will become apparent from reading the detailed description given by way of nonlimiting example which follows, with reference to the attached drawings which depict.

Figure 1:
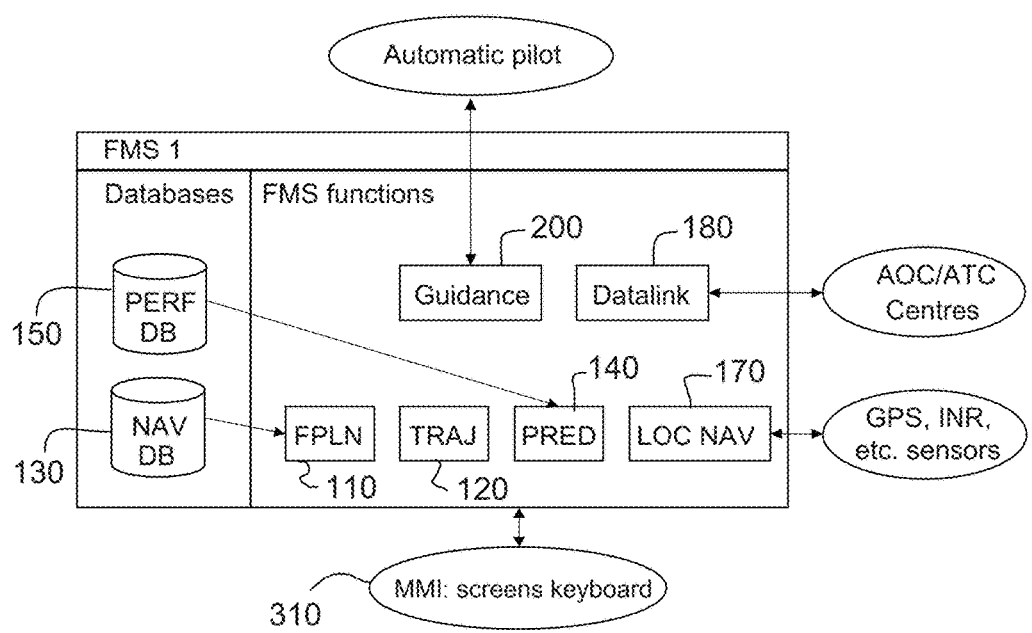
FIG. 1: a functional diagram of the various capacities of a Flight Management System (FMS) according to the prior art.

Some English-language acronyms commonly used in the technical field of the present application may be used during the course of the description. These acronyms are listed in the table below, which notably gives their English name in full, together with an explanation of their meaning.

| Acronym | English name | Meaning |
| --- | --- | --- |
| AOC | Aeronautical Operational Control | A set or subset of the applications used by an aircraft to communicate with ground services. |
| ATC | Air Traffic Control | A service provided by air traffic controllers on the ground to move an aircraft around safely on the ground. |
| CAS | Calibrated Air Speed | Air speed as calculated by the on-board instruments. |
| CDA | Continuous Descent Approach | An approach procedure that has only descent segments and has no or a minimized number of stepped segments, unlike conventional approach procedures. |
| CDO | Continuous Descent Operations | Another name for CDA. |
| DB | DataBase | A container for storing and retrieving all of the information related to an activity. Generally in computer form. |
| EFB | Electronic Flight Bag | A device for managing electronic data that assists the crew with performing flight management tasks more effectively and using less paper. |
| FAF | Final Approach Point | The last fixed point of an aircraft flight path prior to landing, from which it generally begins the final approach segment. |
| FMD | Flight Management Display | A flight display system incorporated into a FMS system. |
| FMS | Flight Management System | A computerized system capable of calculating the aircraft flight paths and flight plans and of supplying the pilot or automatic pilot with guidance instructions suited to following the calculated flight path. |
| FPLN | Flight PLaN | Collection of geographical elements that make up the framework of the flight path of an aircraft. A flight plan notably includes a departure airport, an arrival airport, and waypoints. |
| FPA | Flight Path Angle | The angle formed between a horizontal line and a line tangential to the direction in which an aircraft is flying. |

-continued

| Acronym | English name | Meaning |
| --- | --- | --- |
| GPS | Global Positioning System | A satellite-based positioning system. |
| INR | INertial Reference | A collection of data supplied by an inertial unit (position, lateral speed, rotational speed, etc.). |
| KCCU | Keyboard Console Control Unit | A Man Machine Interface that may be incorporated into a cockpit comprising a keyboard so that the pilot can input data into the FMS. |
| MCDU | Multifunction Control Display Unit | A Man Machine Interface that may be incorporated into a cockpit allowing numerous data items associated with the FMS to be displayed and captured. |
| ND | Navigation Display | A cockpit display element that shows the lateral flight path. |
| OPD | Optimized Profile Descent | Another name for CDAs, used essentially in the United States. |
| PFD | Primary Flight Display | A display element that may be incorporated into a cockpit. |
| TAS | True Air Speed | The speed of an aircraft within a mass of air. |
| VD | Vertical Display | A display element that may be incorporated into a cockpit and that displays the vertical path of the aircraft. |
| VFE | Flaps Extended Speed | The maximum air speed that an aircraft can adopt to remain within its flight envelope in a configuration referred to as a high-lift configuration, which means to say a configuration in which the slats and/or the flaps are extended. |

DETAILED DESCRIPTION

In the remainder of the description, the method according to the invention is illustrated by examples relating to the construction of vertical profiles for CDA approach procedures, even though it should be noted that the invention may be applied to any operation requiring vertical flight profiles with constant ground gradient, including procedures involving climbing with constant ground gradient.

FIG. 1 depicts a functional diagram of various capacities of a FMS 1 of an aircraft according to the prior art. A flight management system may be implemented by at least one computer carried on board the aircraft. The FMS 1 notably determines a geometry of a flight plan profile followed by the aircraft. The path is calculated in four dimensions: three dimensions of space and a time/speed profile dimension. The FMS 1 also, via a first pilot interface 310, transmits to a pilot, or to an automatic pilot, guidance instructions calculated by the FMS 1 for following the flight profile.

A flight management system may comprise one or more databases such as the database PERF DB 150 and the database NAV DB 130. The databases PERF DB 150 and NAV DB 130 respectively contain aircraft performance data and air navigation data, such as routes and beacons.

Flight plan management according to the prior art may call upon means whereby the aircraft crew create/modify the flight plan via one or more man machine interfaces, for example:
an MCDU;
a KCCU;
an FMD;
an ND;
a VD.

One capacity of the FMS 1 may be a function of managing the flight plan 110, usually denoted FPLN. The FPLN capacity 110 notably allows control of the various geographical elements that make up the skeleton of a route that the aircraft is to follow, comprising: a departure airport, waypoints, airways to be followed, and an arrival airport. The FPLN capacity 110 also allows control of various procedures that form part of a flight plan, such as: a departure procedure, an arrival procedure, one or more holding procedures. The FPLN capacity 110 notably allows a primary or secondary flight plan to be created, modified, deleted.

The flight plan and its various information items connected notably with the corresponding path calculated by the FMS may be displayed for the crew to consult using display devices 310, also referred to as man-machine interfaces, present in the cockpit of the aircraft such as an FMD 310, an ND 310, a VD 310. The VD 310 notably displays a vertical flight profile.

The FPLN capacity 110 calls upon data stored in databases PERF DB 150 and NAV DB 130 to construct a flight plan and the associated path. For example, the database PERF DB 150 may contain aerodynamic parameters of the aircraft or even characteristics of the aircraft engines. It notably contains the performance margins systematically applied in the prior art in order to guarantee margins of safety on the descent and approach phases. The database NAV DB 130 may for example contain the following elements: geographical points, beacons, airways, departure procedures, arrival procedures, altitude, speed or gradient constraints.

One capacity 130 of the FMS, referenced TRAJ 120 in FIG. 1, makes it possible to calculate a lateral path for the flight plan defined by the FPLN capacity 110. The TRAJ capacity 120 notably constructs a continuous path from points of an initial flight plan while at the same time respecting the aircraft performances supplied by the database PERF DB 150. The initial flight plan may be a live, temporary, secondary flight plan. The continuous path may be presented to the pilot by means of one of the man machine interfaces 310.

One capacity of the FMS 1 may be a path prediction function PRED 140. The prediction function PRED 140 notably constructs an optimized vertical profile from the lateral path of the aircraft as supplied by the TRAJ function 120. To that end, the prediction function PRED 140 uses the data from the first database PERF DB 150. The vertical profile may be presented to the pilot for example by means of a VD 310.

One capacity of the FMS 1 may be a location function referenced LOCNAV 170 in FIG. 1. The LOCNAV function 170 notably performs optimized real-time geographic location of the aircraft as a function of the geolocation means carried onboard the aircraft.

One capacity of the FMS 1 may be a guidance function 200. The guidance function 200 notably supplies the automatic pilot or one of the man machine interfaces 310 with flight commands that allow the aircraft to be guided in the lateral and vertical geographic planes (altitude and speed planes) so that the said aircraft follows the path laid down in the initial flight plan.

FIGS. 2a, 2b, 2c and 2d respectively depict a possible speed profile, an "early" speed profile, an "optimized" speed profile and a speed profile definition envelope according to the prior art.

During an approach procedure a FMS system 1 according to the prior art is capable, knowing the position of the aircraft and the list of waypoints before the final approach, of determining the remaining horizontal distance to be covered before the said final approach. According to the prior art, it is possible, by adjusting the moments at which aerodynamic configuration is applied, namely the moments at which the aircraft modifies the position of its slats, flaps, landing gears and air brakes, to construct a speed profile that allows it to decelerate down to a final approach speed over the horizontal distance remaining to be covered. To do so, a FMS according to the prior art contains all the necessary information, notably in the database PERF DB 150, for determining, as a function of the aerodynamic configuration of the aircraft and of the environment thereof, how the speed of the aircraft will evolve. It may conversely, from two speed constraints at two points, determine the aerodynamic configuration that needs to be adopted in order to cause the aircraft speed to evolve in such a way as to validate the speed constraints.

Figure 2A:
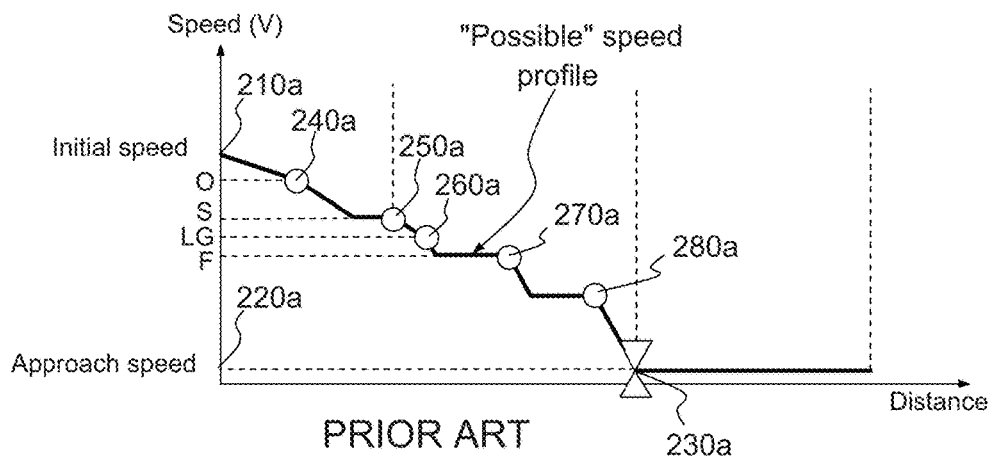
FIGS. 2a, 2b, 2c and 2d: respectively a possible speed profile, an "early" speed profile, an "optimized" speed profile and a speed profile definition envelope according to the prior art.

FIG. 2a depicts a possible speed profile according to the prior art. This speed profile represents progressive deceleration between an initial speed 210a, which may be a cruising speed, and an approach speed 220a which is the speed that has to be reached at the stabilization point 230a, generally situated 500 or 1000 feet from the ground.

This profile comprises several moments referred to as configuration application moments 240a, 250a, 260a, 270a and 280a. These moments correspond to changes in the aerodynamic configuration of the aircraft giving the aircraft additional capacity to decelerate. FIG. 2a depicts a speed profile for which the aerodynamic configurations involve the slats and the flaps, as part of a conventional landing procedure. It should be noted that the following configuration application sequence is specific to landing and differs from that applied on takeoff which consists in retracting the slats and flaps rather than extending them. It is the following configuration application points that are notably seen for landing:

the point 240a represents the point at which the slats are deployed, generally referred to as "configuration 1" in common aeronautical parlance from a configuration referred to as "clean". The point "O", generally thus referred to in common aeronautical parlance, along the speed axis, indicates the minimum speed at which it is possible to deploy the slats;

the point 250a represents the point at which a first extension of the flaps is deployed, generally referred to as "configuration 2" in common aeronautical parlance. The point "S" generally so called in common aeronautical parlance, on the speed axis, indicates the minimum speed at which it is possible to deploy the first extension of the flaps. Deploying the flaps causes an increase in aerodynamic drag and thus allows the aircraft to decelerate more;

the point 260a represents the point at which the landing gears are deployed. The point "LG" (which stands for "Landing Gear") on the speed axis indicates the minimum speed at which it is possible to deploy the landing gears. Deploying the landing gears further increases the aircraft drag and therefore further increases the capacity for deceleration;

the point 270a represents the point at which a second extension of the flaps is deployed, which may correspond to the configurations referred to as "configuration 3" or "FULL" in common aeronautical parlance. The point "F" generally so termed in common aeronautical parlance, on the speed axis, indicates the minimum speed at which it is possible to deploy the second extension of the flaps. Deploying the second extension of the flaps once again increases the drag and the capacity of the aircraft to decelerate. It is to note that the numbering of the configuration referred to as "configuration x" with x=1 or 2 or 3 for example is dependent on the number of control surface settings available, which is itself dependent on the carrier or type of aircraft.

Aircraft approach is generally performed at reduced thrust, close to IDLE thrust, the thrust being adapted to sustain the desired speed for a given gradient. In the profile shown in FIG. 2a, the decelerations are generally followed by phases at constant speed before the next configurations and decelerations are applied.

However, it is possible, by modifying the moments at which configurations are applied, to modify the descent speed profile, the speed for a given configuration being limited to a minimum speed connected to the lift of the aircraft, in order to avoid stalling.

Figure 2B:
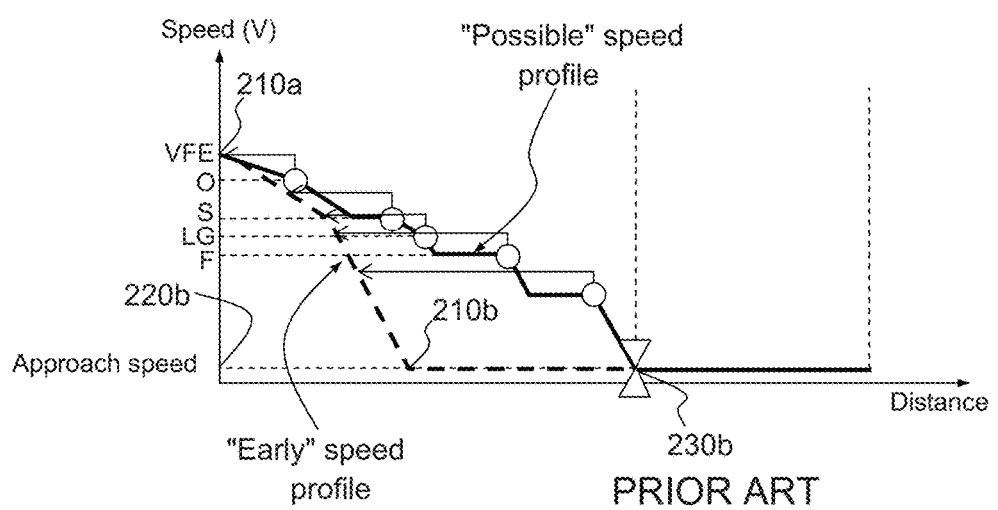

FIG. 2b represents what is referred to as an "early" speed profile according to the prior art. In the context of this profile, each of the instants at which configurations are applied has been brought forward so that it occurs right from the end of the deceleration phase brought about by the previous aerodynamic configuration.

As a result, the aircraft will decelerate to the maximum of its capacity in order to reach an approach speed 220b at a point 210b which is very much earlier than the final approach point 230b. The profile is therefore the said to be "early" because each moment at which configuration is applied is brought forward as far as possible.

Figure 2C:
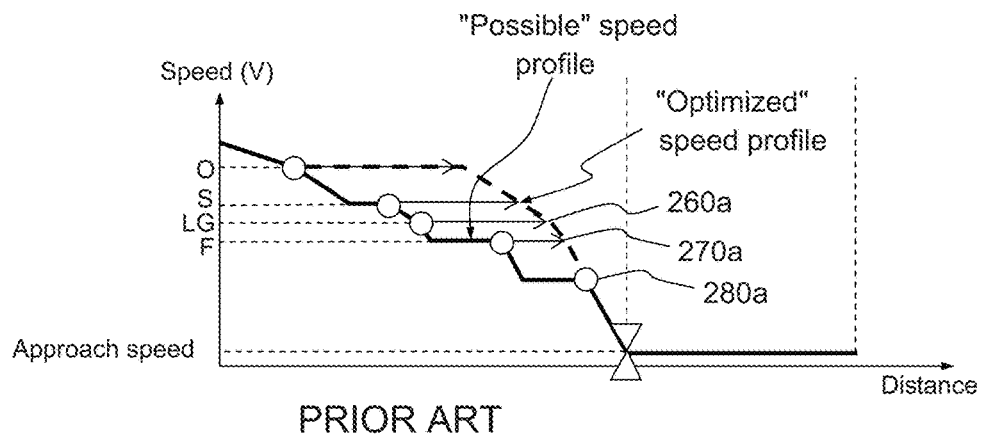
Figure 2D:
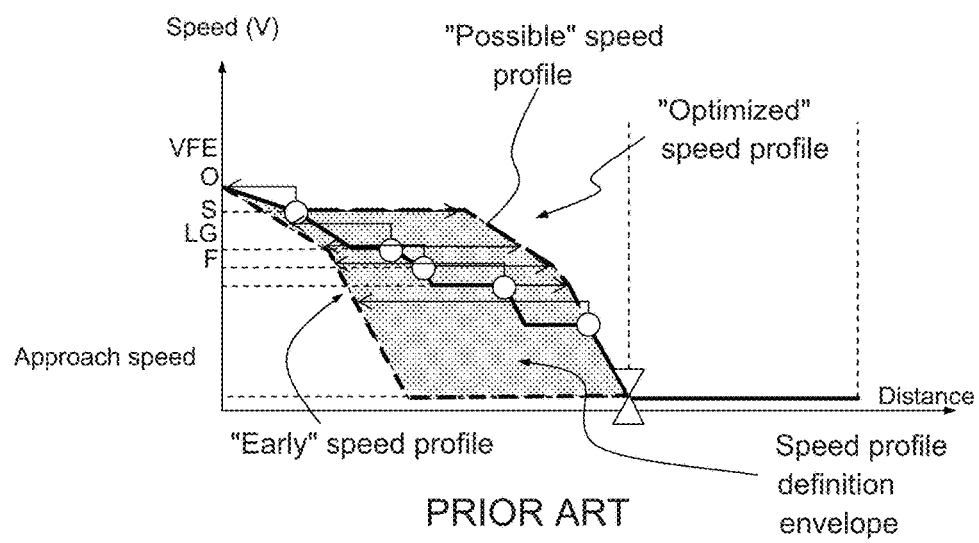

FIG. 2c represents an "optimized" speed profile according to the prior art. This profile has been constructed by delaying each of the configuration times as far as possible and by iteratively determining the moments at which to apply the configurations, from the last to the first, to allow deceleration to be applied as late as possible. Thus, the moment for applying configuration "F" is delayed to point 270a so as to have just enough distance in which to decelerate, increased by margins from PERF DB 150 in the current prior art so as to arrive at the point 280a with the desired speed for beginning the final approach. Likewise, the moment for applying configuration "LG" 260a is delayed as far as possible so as to arrive at the point 270a with just enough speed to switch to configuration "F" early enough to sustain all the following speeds. Thus, by starting from the last moment for applying configuration and working back towards the first it is possible to obtain a speed profile that allows the distance to final approach to be covered with the highest possible speed at each moment.

The optimized profile appears to be the more advantageous to fly in terms of fuel consumption, for the following various reasons:

the optimized profile 2c is the profile for which the aircraft speed is the highest, at each point in the approach path. Because the distance covered is the same, it is therefore the profile for which the journey time will be the shortest. In addition it is the one for which the time spent in a high-lift configuration which therefore has high aeronautical drag and high thrust will be the shortest. This then is the path that is most fuel-efficient.

In addition, the optimized profile 2c is the profile for which the aircraft flies the highest, making it possible to reduce noise pollution in the generally densely populated regions surrounding airports. In the context of approach procedures, altitude, speed, gradient or time constraints may be associated with each of the waypoints followed by the aircraft. The vertical constraints define an altitude, or possibly minimum and maximum altitudes, at which the aircraft needs to overfly each of the waypoints. Knowing the horizontal distance of the various waypoints before the final approach, a FMS system 1 according to the prior art will then be able to calculate, from the aerodynamic configurations and speed profiles 2a, 2b or 2c, an approach path that comprises the horizontal position, altitude, aerodynamic configuration and speed of the aircraft at each moment.

One major disadvantage with this method is that it is impossible to construct from the outset a speed profile that guarantees that the path constructed will be flyable. This is because since altitude constraints lead to descent gradients, it is from the outset impossible to determine whether the aerodynamic configuration/descent gradient/speed will all fall inside the flight envelope of the aircraft for the entirety of a path. It is therefore the responsibility of the pilot to make sure that the path calculated is indeed flyable, and, if not, take the necessary corrective measures.

In the case of an "optimized" speed profile 2c, the pilot will have no freedom to adjust the moments at which aerodynamic configurations are applied. This is because if a moment of application of configuration has been delayed excessively on comparison with the deceleration capacity of the aircraft, the pilot will no longer have any leverage for increasing the deceleration. Such an optimized flight profile (calculated without a margin) 2c is also somewhat unrobust with regard to unforeseen events. For example, in the event of a tail wind that is slightly stronger than anticipated, the aircraft will have been slightly ahead of schedule on the path laid down. The progressive deceleration as far as the start of approach point will therefore no longer be valid. In either event, the pilot may be forced to use his air brakes or even to perform a last-minute go-around, with disastrous consequences in terms of fuel consumption and noise pollution.

According to the prior art, the conventional procedure for avoiding deploying the air brakes or even performing a last-minute go-around is therefore to apply various margins with respect to the capacity of the aircraft to decelerate and to anticipate the moments at which configurations are applied to the aircraft, so as to leave the pilot the possibility of altering the configuration of the aircraft in the event of unforeseen circumstances. This leads the aircraft to adopt an approach path that is suboptimal in terms of fuel consumption. A FMS system 1 according to the prior art is, on the other hand, incapable from the outset of determining a speed profile that falls within the speed profile definition envelope 2d, being as optimized as possible while at the same time guaranteeing that the path constructed is flyable at each point.

Figure 3:
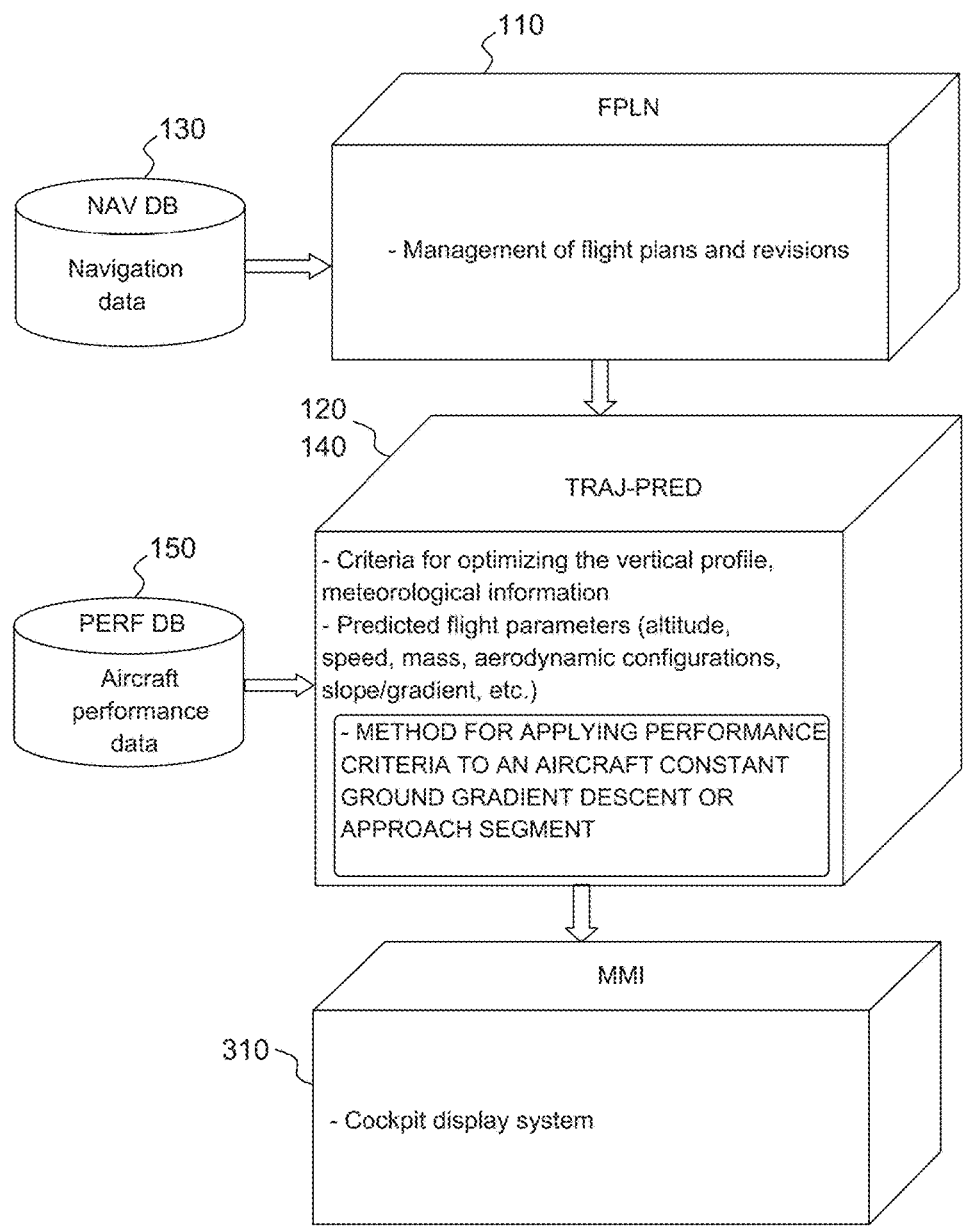
FIG. 3: one example insertion of the invention within a system of FMS type.

FIG. 3 represents one example of the insertion of the invention into a system of FMS type. This figure is given by way of example only and it should be noted that the invention may also be applied to any system dealing with calculating aircraft path segments with constant ground gradient. In particular, it can be applied to a system that calculates an aircraft path on the ground and transmits the said path to the aircraft to execute.

In the context of this FMS system according to the invention, the FPLN module 110 constructs a list of waypoints for the descent, notably using navigation data contained in the NAV DB module 130. This list of waypoints is then transmitted to the TRAJ module 120 and PRED module 140. The invention may notably be implemented within this TRAJ module 120 and this PRED module 140, making it possible to construct a path that is as optimized as possible while at the same time ensuring that the capacity of the aircraft to fly as defined in the aircraft performance database PERF DB 150 is met.

According to certain embodiments, the path is presented to the pilot via a man machine interface system 310.

Figure 4:
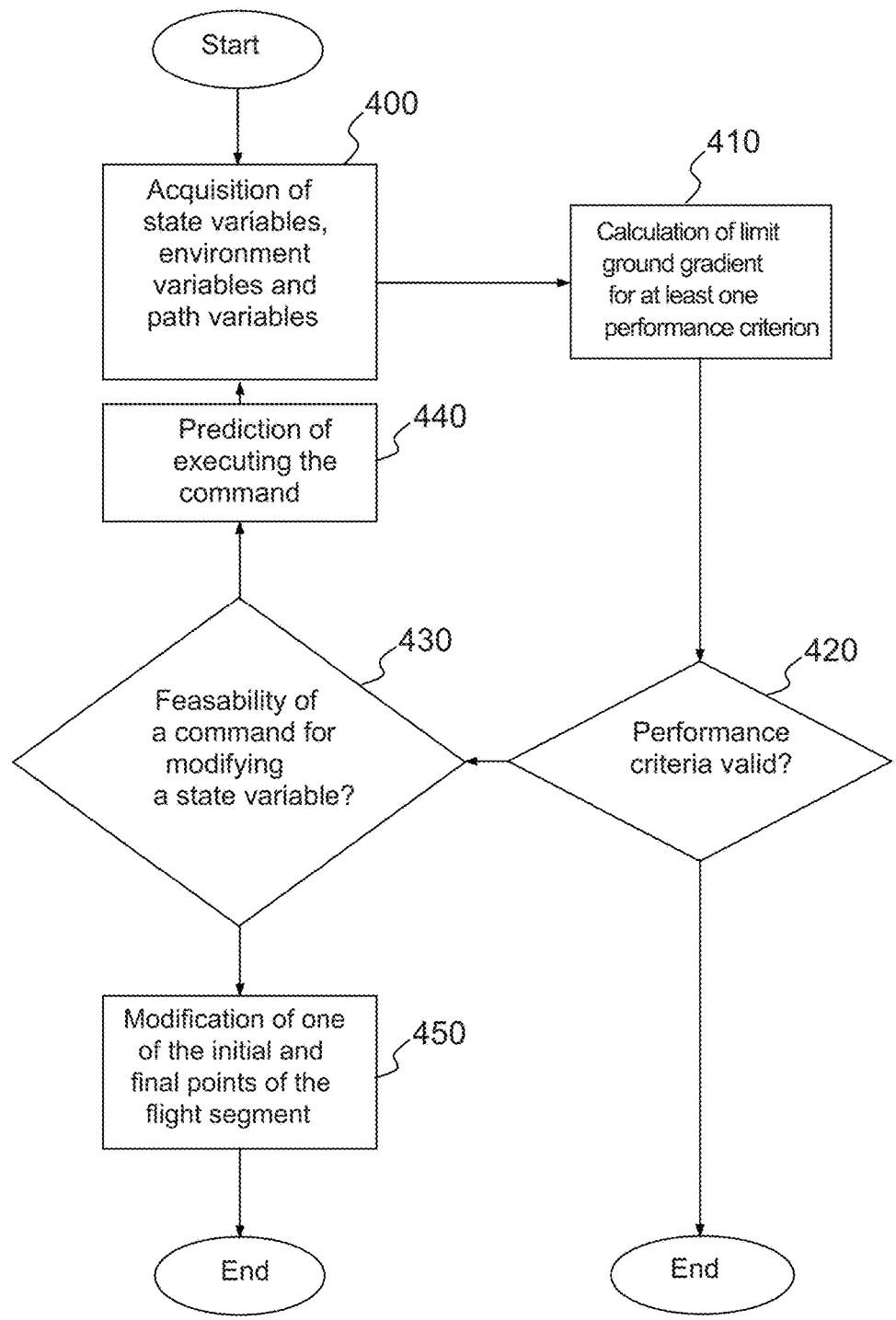
FIG. 4: a flow diagram illustrating a method according to the invention.

FIG. 4 represents a flow diagram of a method according to the invention.

The method applies to a path segment of constant ground gradient. The flight plan segment may have been initialized beforehand by a path creation method according to the prior art. It may also be defined, at least at one of its ends, by a limit condition for joining a second path segment according to the invention.

A method according to the invention notably comprises calculating a limit ground gradient. What is meant by a limit ground gradient is a ground gradient that limits the domain considered as being flyable by the aircraft. In many cases, the limit ground gradient is a minimum gradient (in the sense that the ground gradient of an aircraft is negative during a descent) that allows an aircraft to validate a performance criterion while at the same time remaining inside its flight envelope. In some cases this is a maximum gradient. For example, a maximum ground gradient may be obtained in order to avoid an aerial zone or an obstacle on the ground. A number of examples of limit ground gradient will be expanded upon later on in the description.

A method according to the invention notably comprises the following steps:
- an acquisition step 400 in which state variables characterizing the aircraft, environment variables characterizing the environment thereof, path variables characterizing the predicted path thereof at one of the initial and final points of the segment are acquired;
- a calculation step 410 whereby a limit ground gradient for at least one performance criterion is calculated from the said state variables, the said environment variables and the said path variables;
- a validation step 420 of validating the ground gradient of the segment with respect to the limit ground gradient obtained in step 410;
- a feasibility verification step 430 checking the feasibility of a command to modify at least one state variable;

if feasibility is verified, a step 440 of predicting the execution of the said command, followed by a further calculation of limit ground gradient using the new state variables;

if feasibility is not verified, a step 450 of predicting a modification to one of the initial and final points of the segment subject to constraints in the flight plan.

The acquisition step 400 of acquiring the state variables, the environment variables and the path variables comprises acquisition of all the variables that will make it possible to predict how the aircraft will behave when covering the path segment. This set of variables notably comprises:

state variables connected with the aircraft, for example the mass of the aircraft, the position of the centre of gravity, the altitude of the aircraft, the ground speed and air speed of the aircraft, the air gradient, the aerodynamic configuration of the aircraft, the position of the throttle lever, the anti-ice system status, the vertical load factor, or even the various commands that may be supplied to the aircraft as it covers the flight segment;

environment variables characterizing the environment of the aircraft, for example the temperature, the atmospheric pressure or even the wind strengths and wind directions;

path variables characterizing the predicted path of the aircraft, for example the predicted ground gradient, the altitude of the initial and final points of the segment, or even the predicted time for passing through said initial and final points of the segment.

Acquisition of the state variables, environment variables and path variables connected with the aircraft is performed at least at one of the initial and final points of the segment. According to one set of embodiments of the invention, the state of the aircraft is known at the initial point of the segment. It is therefore possible, using all of the state, environment and path variables acquired and an aerodynamic performance database such as the PERF DB 150, to predict how the state of the aircraft will evolve over the entire segment. This method of prediction is referred to as "forward" prediction insofar as it allows the various states of the aircraft to be determined at later points in the path from a state that is known at the start of the path. According to other embodiments of the invention, the state of the aircraft is known at the final point of the segment. It is then possible, using all of the state, environment and path variables acquired and using an aerodynamic performance database such as the PERF DB 150 to calculate what the state of the aircraft needs to be at the initial point of the segment in order to achieve the set final state. This mode of prediction is referred to as "backward" prediction insofar as it makes it possible to "work back" from a known state at the end of the path towards the start of the path and determine successively the states of the aircraft at the various points on the path.

The step 410 consists in calculating a limit ground gradient that allows at least one performance criterion to be satisfied, from the state, environment and path variables acquired in step 400. It notably makes it possible to ensure that the path segment is flyable while still complying with the said performance criterion, and remaining in the permissible flight domain supplied by an aerodynamic database such as the PERF DB 150. It is possible to apply this step to each of the criteria adopted for constructing the path. It is notably possible to calculate a limit ground gradient that satisfies the following performance criteria:

operational criteria, for example an altitude constraint or a waypoint arrival time;

criteria that ensure that the path is flyable, for example the capacity of the aircraft to decelerate, the vertical speed, or the onset of unforeseen circumstances;

comfort criteria, for example limiting jerk in the cabin;

safety criteria relating to unforeseen events that may impair the performance of the aircraft or "what if" criteria as they are sometimes known, for example an engine failure, activation of the anti-ice system or an unforeseen tail wind.

More generally, this calculation of limit ground gradient may be applied to any performance criterion that has an impact on the validation of operational constraints, aircraft safety, the fact that the path is flyable, passenger comfort or the onset of unforeseen circumstances that alter aircraft performance. It is possible, for each of these criteria, to apply a margin to the calculation. For example, if it is desirable to calculate the limit ground gradient that will allow a criterion connected with not exceeding a limit jerk value to be validated, it is possible to apply a comfort margin by reducing the limit jerk value and by applying the limit ground gradient calculation for this new value. Likewise, if it is desirable to calculate the limit ground gradient that will allow a limit deceleration criterion to be met, it is possible to apply a margin of safety by increasing the deceleration value, then by calculating the limit ground gradient for this new value.

A method according to the invention therefore makes it possible, on completion of step 410, to obtain at least one limit ground gradient, for at least one performance criterion, while at the same time having incorporated any relevant margins into the calculation of the said limit gradients. The ground gradient will therefore be validated according to the most restrictive performance criterion, thereby making it possible to ensure that all the performance criteria and associated margins are adhered to, without needlessly combining the margins of safety and imposing excessive constraints on the calculated ground gradient.

Step 420 consists in comparing the predicted/calculated ground gradient of the segment against each of the limit ground gradients for each of the performance criteria so as to verify whether the performance criteria are validated. In one embodiment of the invention, the comparison is validated if the predicted ground gradient of the segment is less than or equal in absolute value to each of the ground gradients for each of the performance criteria adopted. If the ground gradient is validated, the flight segment and predicted execution of the flight controls are not changed. If not, the following steps allow the predicted path to be modified so as to validate the performance criteria.

Step 430 makes it possible to verify the feasibility of a command to modify at least one state variable. In one preferred embodiment, this step verifies the possibility of modifying state variables that have an impact on the flight performance of the aircraft, for example the following state variables:

the engine thrust resultant;
the extension of the slats and flaps;
the deployment of the landing gear;
the extension of the air brakes.

More generally, the feasibility of a command to modify a state variable may be evaluated for any actuator that allows the dissipation of total energy or the mechanical energy of the craft to be altered, depending on the design of the aircraft. In one set of embodiments of the invention, step 430 successively verifies, for each of the state variables that have an impact on aircraft performance, if a command to modify this variable permits an increase of the capacity of deceleration of the aircraft; as soon as such a command is identified, the prediction of adjusting this command is performed in step 440; if no command that makes it possible to increase the capacity of the aircraft to decelerate is identified, step 450, that verifies the possibility of modifying the flight segment, is activated.

In one preferred embodiment of the invention, the commands to modify the state variables are tested in the following order:

1. a command to reduce engine thrust. If the engine thrust is higher than the reduced thrust referred to as "IDLE", step 430 verifies the possibility of reducing this thrust. However, it should be noted that in many cases it is impossible to do so, engine thrust generally having already been reduced to a minimum for procedures of the CDA type;
2. a command to extend the slats and flaps. In one embodiment of the invention, step 430 verifies the possibility of extending the slats and flaps into predefined configurations. According to one set of embodiments, predefined configurations are tested. Numerous predefined configurations are possible. For example, it is possible in succession to adopt a configuration referred to as "clean", a number of "intermediate configurations" then a "landing configuration". The "intermediate configurations" and "landing configuration" are obtained by progressively deploying actuators intended to modulate the dissipation of total energy or mechanical energy of the aircraft. Step 430 successively verifies the possibility of extending the slats and flaps by a predetermined extension increment. In one embodiment of the invention, step 430 verifies whether the condition $VFE_{next\_conf} \geq CAS_i$ is verified, in which $VFE_{next\_conf}$ represents the maximum speed of the high-lift configuration after the extending of the slats and flaps, and $CAS_i$ represents the calibrated air speed of the aircraft at the point considered. A high-lift configuration is the name given to a configuration for which the slats and/or flaps are deployed. This configuration makes it possible to increase the lift of the aircraft at low speed, for example on landing. However, these configurations are flyable only up to an air speed referred to as $V_{FE}$, specific to each configuration and below the cruising speed of the aircraft. Verification of this inequality means that, at the air speed of the point in question, the aircraft remains within its flight domain after the slats and flaps have been extended and that this extension can therefore be performed without danger;
3. a command to deploy the landing gear. In one set of embodiments of the invention it is considered that deploying the landing gear is possible if the said landing gear has not already been deployed and if the condition $V_{LO} \geq CAS_i$ is verified. In this expression, $V_{LO}$, which stands for landing gear operation, represents the maximum air speed at which it is possible to lower the landing gears without danger, and $CAS_i$ is the calibrated air speed at the point of flight in question;
4. a command to extend the air brakes. In one embodiment of this part of the invention, step 430 verifies the possibility of extending the air brakes from a "zero" position to a "half-extended" position and then from the "half-extended" position to a "fully extended" position. In another embodiment of the invention, step 430 verifies the possibility of extending the air brakes by extension increments of predefined value.

However, it is possible to test the flight commands in other orders. For example, it is possible to test the extending of the air brakes before the extending of the slats and flaps.

When the feasibility of a command to modify a state variable is verified in step 430, step 440 predicts the execution of the said command. According to one embodiment of the invention, this execution prediction consists in modifying the said state variable as a function of the said command, then in rerunning steps 400 and 410 according to the modified state variables.

When no command to modify a state variable is identified as being possible in step 430, step 450 of predicting the modification of one of the initial and final points of the flight segment is carried out, subject to constraints in the flight plan and continuity of the path. In one embodiment of the invention, step 450 first of all determines a ground gradient for the segment as being the gradient closest to the ground from among the initially predicted ground gradient and each of the limit ground gradients for each of the performance criteria tested. This new predicted ground gradient may notably be determined using the formula $FPA_{fpln} = \max(FPA_{FPLN}, \gamma_{groundi})_{i=1 \text{ to } n}$, in which $FPA_{fpln}$ represents the ground gradient that is constant for the flight segment in question, and $\gamma_{groundi}$ the limit ground gradient for criterion i, n being the number of performance criteria tested. In examples covering descent procedures, the ground gradients are expressed with a negative angle, which means that of a set of gradients the "maximum" gradient will in actual fact be the one of which the absolute value is the lowest, which is therefore closest to the ground.

Determining the ground gradient makes it possible, if a point of the segment is fixed, to determine the altitude of each of the points in the segment and validate that each altitude constraint in the segment is met. In particular, it makes it possible to validate that constraints of the AT, AT OR ABOVE, AT OR BELOW or WINDOW type are indeed validated by the ground gradient determined. The ground gradients may notably be modified in the context of constraints of the WINDOW type called upon to replace the AT constraints for approach procedures of CDA type.

In one embodiment of this part of the invention, a prediction of the "forward" type points the initial point in the flight segment, for example by ensuring continuity with the previous flight segment. Determining the ground gradient then makes it possible to determine the altitude of each of the points in the flight segment, and to determine whether or not any altitude constraints that might be within the segment are validated, notably at the final point of the segment. In a second embodiment, a prediction of the "backward" type points the final point of the flight segment, for example by ensuring continuity with the next flight segment. Determining the ground gradient then makes it possible to determine the altitude of each of the points in the flight segment, and to determine whether or not any altitude constraints that might be present within the segment are validated, notably at the initial point of the segment.

If all the altitude constraints are validated, step 450 modifies the flight segment by modifying the altitude of one of the initial or final points of the segment and the segment is validated against the performance criteria in question. If not, the performance criteria are not validated and it is not possible to adjust the flight segment either by a command to modify the state vector of the aircraft or by modifying one of the initial and final points of the flight segment. It then becomes necessary to redefine the performance criteria and/or to alert the crew to the fact that the flight segment cannot be modified in order to meet these performance criteria.

Figure 5:
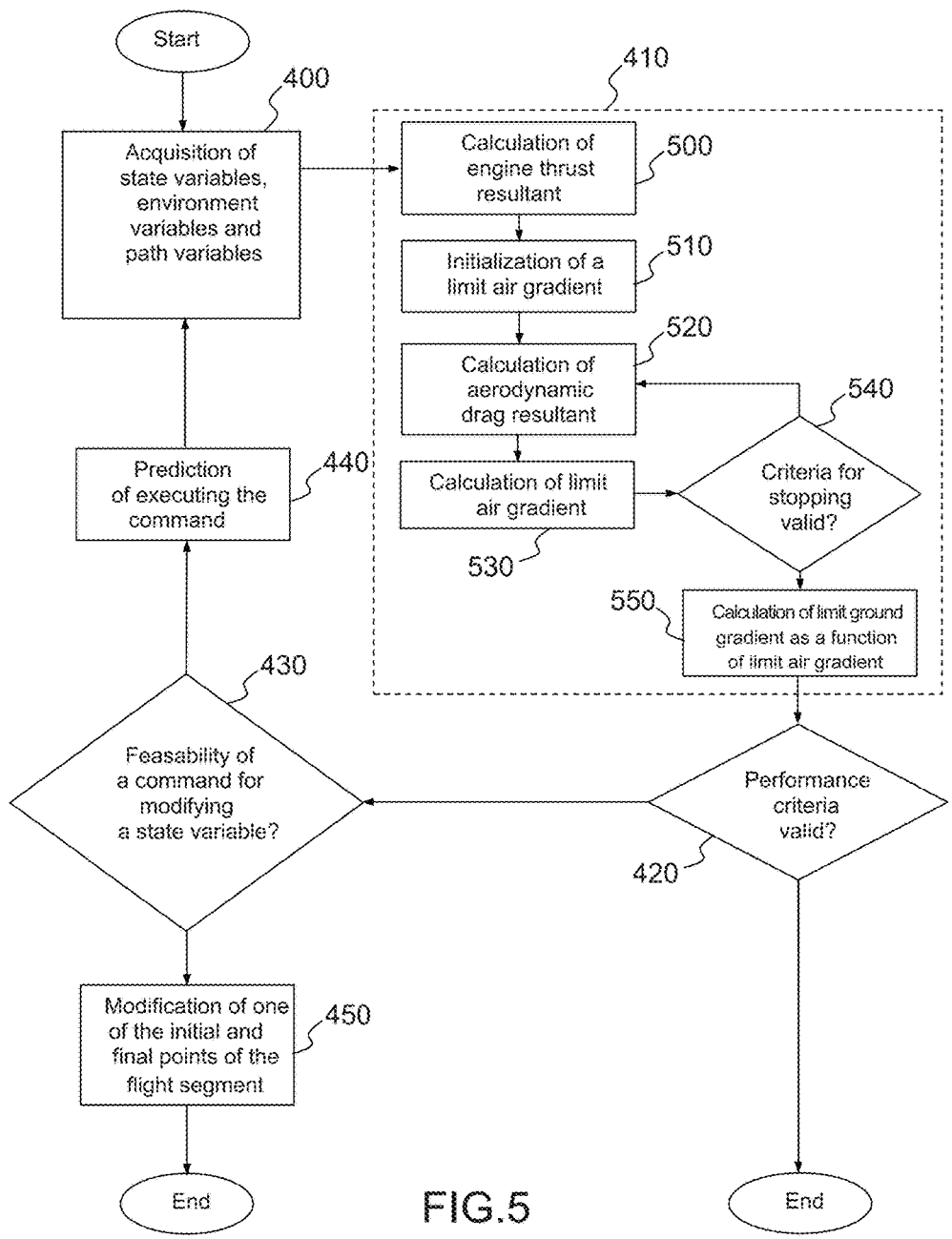
FIG. 5: a flow diagram illustrating part of an example of a method according to one embodiment of the invention.

FIG. 5 is a flow diagram detailing part of a method according to one embodiment of the invention.

This example of a method comprises, in addition to steps 400, 420, 430, 440 and 450, a set of substeps for step 410 of calculating the limit air gradient for each of the performance criteria:

- a step 500 of calculating the engine thrust resultant;
- a step 510 of setting the limit air gradient to a default value;
- a step 520 of calculating an aerodynamic drag resultant as a function of the limit air gradient and of the state variables of the aircraft;
- a step 530 of calculating the limit air gradient as a function of the aerodynamic drag resultant, of the state variables of the aircraft and of the engine thrust resultant;
- a step 540 of verifying a criterion for stopping;
- a step 550 of calculating a limit ground gradient from the limit air gradient.

In this embodiment of the invention, once the state variables, the environment variables and the path variables have been acquired in step 400, the step of calculating the limit ground gradient comprises, for each of the selected performance criteria, first of all calculating the engine thrust resultant in step 500, then setting a limit air gradient in step 510. The limit air gradient is then obtained by iteratively calculating the aerodynamic drag resultant as a function of the limit air gradient in step 520, and the limit air gradient as a function of the aerodynamic drag resultant in step 530, this iteration continuing until a criterion for stopping is validated in step 540. This iterative procedure makes it possible to make best use of the aerodynamic performance databases PERF DB 150 according to the prior art, because these databases make it possible to determine, from aircraft performance charts, an air gradient from a drag resultant and the collection of state variables of the aircraft, and a drag resultant as a function of an air gradient and of the set of state variables of the aircraft, but do not allow the two to be determined jointly. Once the criterion for stopping has been validated, step 550 allows the limit ground gradient to be determined directly as a function of the limit air gradient.

Step 500 of calculating the engine thrust resultant is known from the prior art. It is thus possible, in a FMS system 1 according to the prior art, to extract an engine thrust resultant from an aerodynamic performance database PERF DB 150 using state variables associated with the aircraft and variables associated with the environment thereof, for example the altitude of the aircraft, the MACH number thereof, the aerodynamic configuration of the aircraft, the position of the hand throttle, the status of the anti-icing system, the number of engines in operation, or the temperature or any other value representative of the aircraft or of its environment.

The step 510 consists in setting the air gradient, also denoted $\gamma_{air}$, to a default value so that the iterative calculation of the limit air gradient can be initialized. In one embodiment of the invention, the limit air gradient is set to a value that is commonplace for procedures of the CDA type, for example −3°. In a second embodiment of the invention, the initial value set is dependent on the aerodynamic characteristics of the aircraft and on the desired level of deceleration. The initial value set may for example be precalculated in a table which as input has the aerodynamic configuration of the aircraft and the desired level of deceleration and as output has the initial gradient set. It may also be calculated using aircraft state variables and the PERF DB 150.

Step 520 of calculating the aerodynamic drag resultant is known from the prior art. It consists, using an aerodynamic performance database such as the PERF DB 150, in calculating the aerodynamic drag resultant from state variables connected with the aircraft or variables connected with the aircraft environment, for example the mass of the aircraft, the position of the centre of gravity of the aircraft, the true air speed or TAS of the aircraft, the air gradient $\gamma_{air}$, the aerodynamic configuration of the aircraft, the position of the hand throttle, the status of the anti-icing system, the number of engines in operation, the vertical load factor, the temperature or any other data representative of the aircraft or of the aircraft environment.

Step 530 of calculating the limit air gradient consists in calculating the value of the limit air gradient as a function of the aerodynamic drag resultant calculated in step 520, of a set of state variables connected with the aircraft and of variables connected with the aircraft environment, and of a performance criterion.

By way of example, the limit air gradient can be calculated as a function of a limit deceleration value of the aircraft $$\frac{dCAS}{dt},$$

where CAS represents the air speed or, more specifically, the Calibrated Air Speed. According to the prior art, it is possible to determine the air gradient of an aircraft in a deceleration phase:

$$\gamma_{air} = \arcsin\left(\frac{\frac{F-D}{m} - \frac{TAS}{CAS} \cdot \frac{dCAS}{dt}}{\left[g\frac{TAS^2}{2RT} + g\right]}\right)_i$$

in which:
- F represents engine thrust, expressed in N;
- D represents aerodynamic drag, expressed in N;
- M represents the predicted mass of the aircraft, expressed in kg;
- TAS represents the true air speed of the aircraft, expressed in m·s$^{-1}$;
- CAS represents the calibrated air speed, expressed in m·s$^{-1}$;

$$\frac{dCAS}{dt}$$

represents the limit value of deceleration used for the performance criterion, in m·s$^{-2}$;
- g represents the acceleration due to gravity at the waypoint in question, and is expressed in m·s$^{-2}$;
- R represents the perfect gas constant and is expressed in J·kg$^{-1}$·K$^{-1}$;
- T represents the temperature and is expressed in K.

In one embodiment of the invention, the deceleration is fixed by a constraint for a given point. For example, it is possible to point a deceleration value less than or equal to 0 on passing the FAF, so as to guarantee that the aircraft has the capacity to decelerate in its final approach segment. It is also possible, for example, for final approach procedures, to point a deceleration capacity of 0.5 knots per second at the point of stabilization of the kinetic energy.

In another embodiment, the limit value for deceleration is fixed at a point in the segment that is considered to be the most restrictive, for example the initial point. In another embodiment, the limit value for deceleration is fixed as a function of the current speed and a next speed constraint. In that embodiment the limit value of deceleration to be achieved can be determined using the equation:

$$\frac{dCAS}{dt} = \frac{CAS_i - CAS_{WPT\_CSTRT}}{t_i - T_{WPT\_CSTRT}}$$

in which:

$CAS_i$ represents the predicted calibrated air speed of the aircraft at a waypoint;

$t_i$ represents the predicted time of arrival at the waypoint considered;

$CAS_{WPT\_CSTRT}$ represents the predicted next speed constraint of the aircraft;

$t_{WPT\_CSTRT}$ represents the predicted time at the next speed constraint waypoint.

It should be noted that, during a descent phase, the aerodynamic configuration of the aircraft evolves, as the slats, flaps, landing gears and possibly air brakes are progressively deployed, with an ever increasing capacity to decelerate. Thus, a limit capacity for deceleration is conservative and can only increase over time, for meteorological conditions assumed to be stable, and it is possible to calculate the capacity of an aircraft to decelerate at a point i by considering that the capacity of the aircraft to decelerate over a flight segment that has i as its initial point will be at least equal to the capacity of the said aircraft to decelerate at the point i.

In one set of embodiments of the invention it is possible to apply margins for safety criteria of the aircraft in step 530. For example, in order to apply a margin of safety regarding the capacity of the aircraft to decelerate, it is possible to modify the deceleration value $$\frac{dCAS}{dt},$$

for example by multiplying it by a multiplicative safety factor, then using this value for calculating the limit air gradient. The calculated limit air gradient thus incorporates the desired margin of safety.

Step 540 consists in validating or failing to validate a criterion for stopping the iteration of steps 520 and 530. In one embodiment of the invention, the criterion for stopping relates to the difference between the air gradient initially predicted for the calculation of step 520, and the air gradient calculated in step 530. If these two air gradient values are sufficiently close together, the air gradient is validated and used for the calculation in step 550. If not, at least one additional iteration is required in order to cause the air gradient value to converge and the air gradient value calculated in step 530 is reused for a further calculation iteration 520. In one set of embodiments of the invention, the criterion for stopping is validated when the air gradients obtained in two successive iterations exhibit an angular difference which in absolute terms is below a predefined threshold. This predefined threshold may notably have a value considered as being small enough to guarantee convergence of the algorithm. By way of example, the criterion for stopping can be considered to be validated when the two gradients differ by less than 0.001°.

Step 550 consists in calculating the limit ground gradient from the limit air gradient. This calculation is known from the prior art and the limit ground gradient $\gamma_{ground}$ is obtained by:

$$\gamma_{ground} = \arctan\left(\frac{V_{GND} + V_{Wx}}{V_{GND}} \cdot \tan(\gamma_{air})\right)_i$$

where $V_{GND}$ represents the ground speed of the aircraft and can be calculated using the equation:

$$V_{GND} = \sqrt{(TAS^2 - V_{Wy}^2)} \cdot \cos(\gamma_{air}) + V_{Wx}$$

In these two equations, $V_{Wx}$ and $V_{Wy}$ represent the wind speed projected onto the x and y axes of the aircraft respectively.

Figure 6:
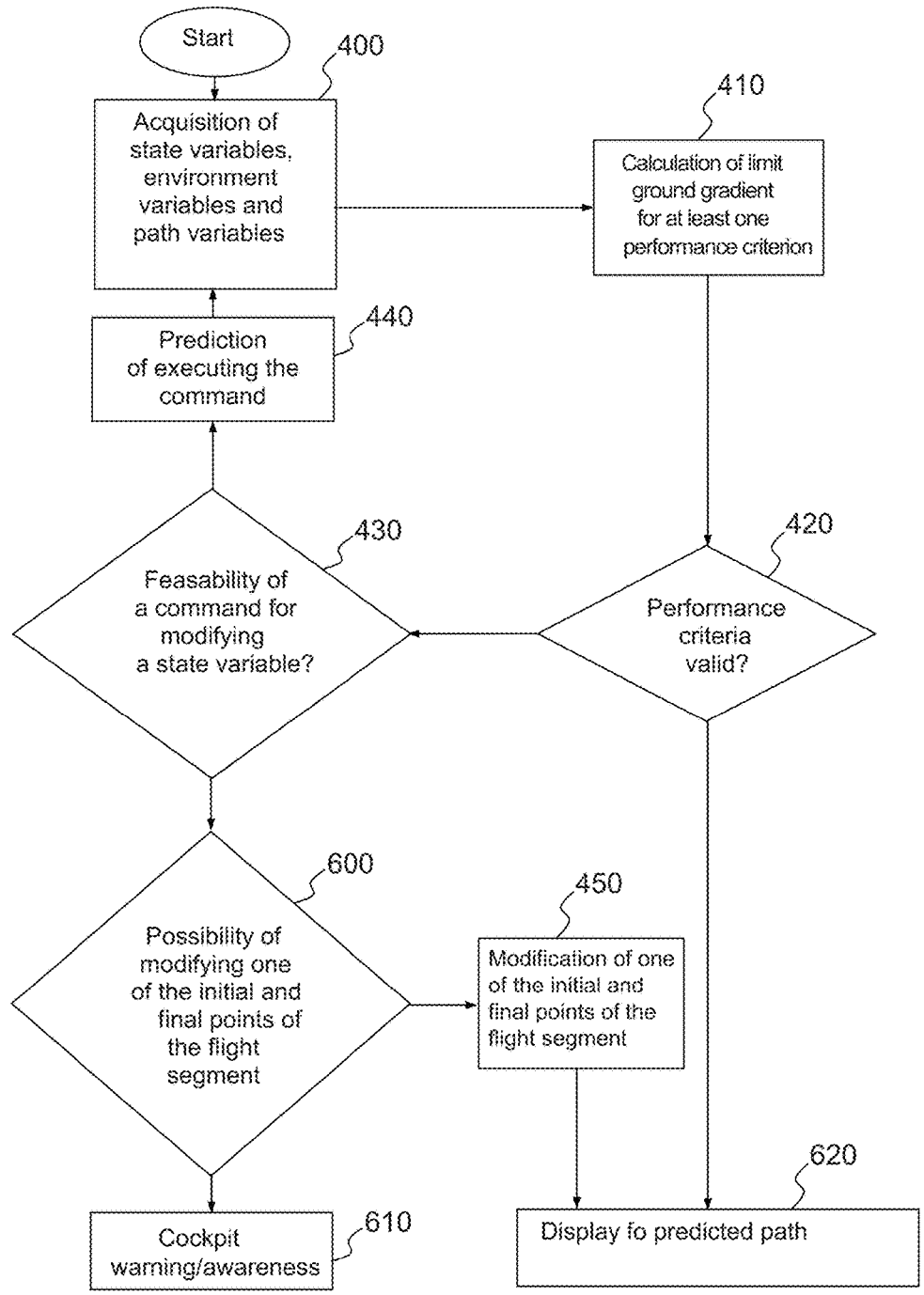
FIG. 6: a flow diagram detailing another part of a method according to one embodiment of the invention.

FIG. 6 is a flow diagram detailing another part of a method according to one embodiment of the invention.

This embodiment is given by way of nonlimiting example and comprises, in addition to the steps 400, 410, 420, 430, 440 and 450 described hereinabove:

a step 600 of verifying the possibility of modifying one of the initial and final points of the flight segment;
a cockpit warning step 610;
a step 620 of displaying the predicted path.

The step 600 of verifying the possibility of modifying one of the initial and final points of the segment is activated if the ground gradient of the flight segment being studied does not meet at least one of the adopted performance criteria, and if it has been determined in step 430 that no command to modify state variables of the aircraft is permissible.

This step first of all determines the maximum ground gradient of all of the limit ground gradients determined in step 410. Then, from a point whose altitude is fixed within the segment and from the ground gradient it determines the altitudes of each of the points in the segment. Finally, for each altitude constraint that is active in the flight segment it verifies whether or not this constraint is met.

When all the altitude constraints that apply to the flight segment are verified, one of the initial and final points of the predicted path is modified in step 450 in order to limit the ground gradient according to the greatest of the limit ground gradients calculated in step 410.

A step 620 of displaying the predicted path or the flight segment can then be activated, so as to present the path obtained to the pilot. This step may also be activated at the end of step 420 if the ground gradient of the flight segment in question is greater than the limit ground gradients associated with each of the performance criteria being studied.

The step 620 of displaying the path to the pilot may comprise the display of information on suitable systems in the cockpit, according to the availability thereof. For example, it may involve independently or jointly displaying on:

an FMD;
an ND;
a VD;
a PFD.

More generally, this display may be performed on any system that allows the pilot to be presented with the result of the application of at least one performance criterion to the path of the aircraft in a descent or approach phase.

In a preferred embodiment, any modification to the path or aerodynamic configuration of the aircraft is indicated in the cockpit. In a preferred embodiment, a modification indicated in the cockpit is readily identifiable by the pilots. In particular, the display phase may clearly indicate whether or not the calculated path is flyable, and whether it is "easily" flyable, namely whether or not the aircraft is close to the limit of its actual performance by considering the environmental conditions associated with this path.

When, in step 600, at least one altitude constraint is not met, a cockpit alert step 610 is activated. This step involves a display of information in an aircraft cockpit using the same means as step 610. By contrast, a pilot of the aircraft needs to be clearly informed that the path is not flyable while respecting all of the flight path constraints and performance criteria.

The step 610 may comprise means of alerting the pilot, but also means of modifying the set of constraints and performance criteria, so as to allow a pilot to adjust the criteria and performance constraints applied to the aircraft, and recalculate an approach path.

Figure 7A:
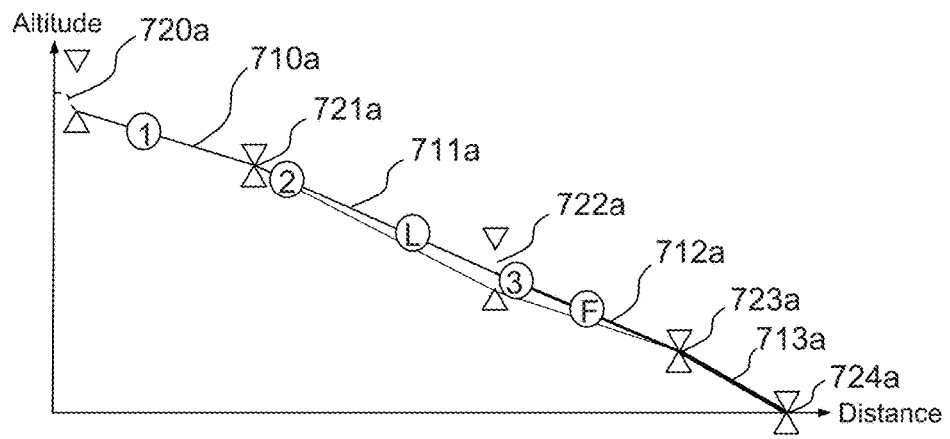
FIGS. 7a, 7b and 7c: three examples of how the vertical paths obtained by a method according to the invention are displayed for the pilot.
Figure 7B:
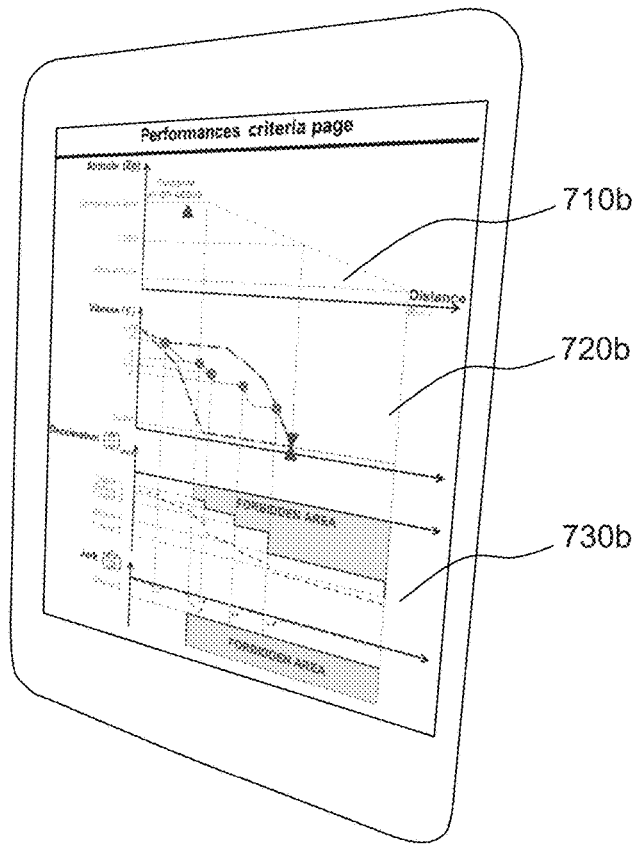
Figure 7C:
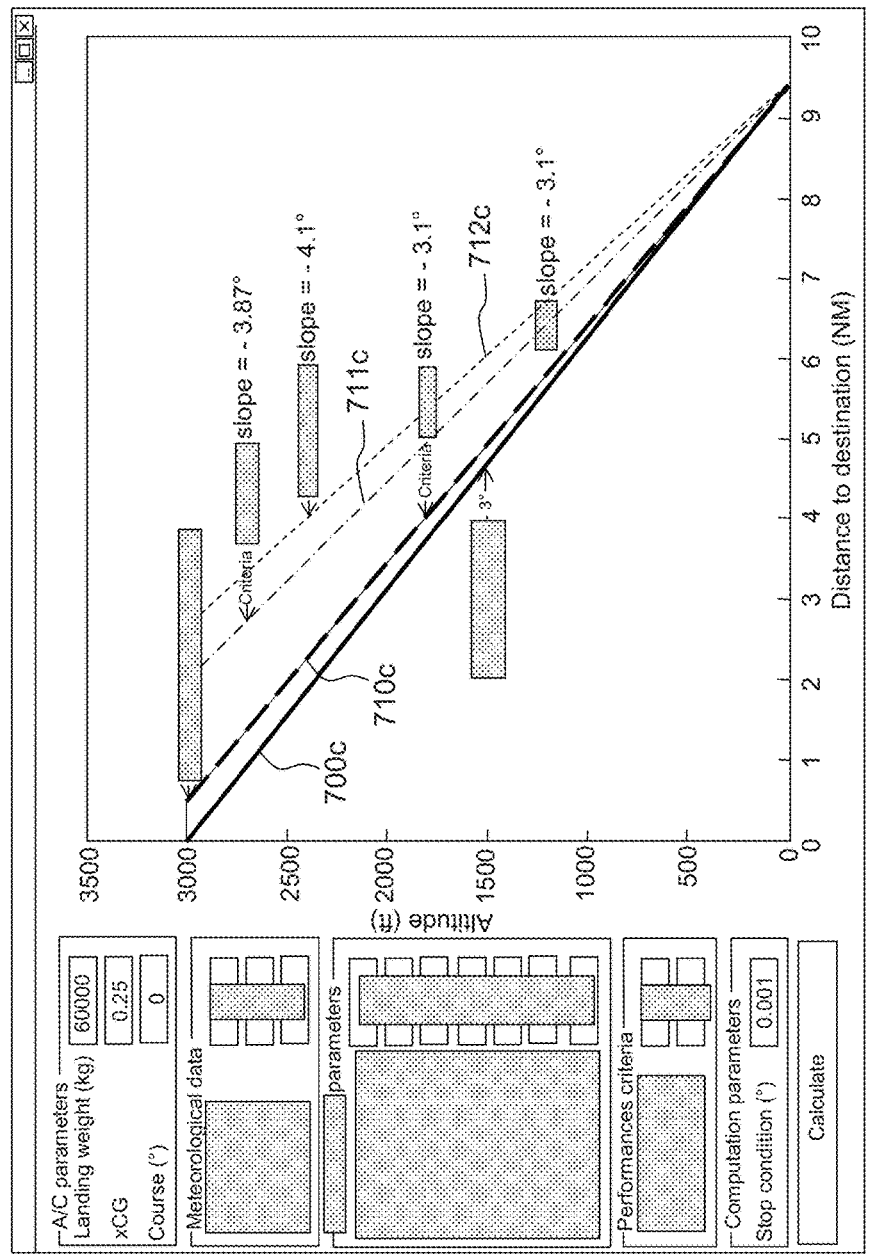

FIGS. 7a, 7b and 7c depict three examples of the displaying to the pilot of vertical paths obtained by a method according to the invention.

FIG. 7a depicts an example of the displaying of a vertical path produced according to the invention on equipment of the VD type or any other means of visually showing the vertical path.

The vertical path comprises 4 segments 710a, 711a, 712a, 713a. In the example, a set of colors identifies the "ease" with which each of the segments can be flown: segments 710a and 711a are considered to be "easily" flyable, and may for example be coloured in green when presented to the pilot. Segment 712a is considered to be "difficult" to fly, and may for example be indicated in orange when presented to the pilot. Finally, segment 713a is considered to be unflyable, and may be indicated in red when presented to the pilot. This display also indicates the altitude constraints 720a, 721a, 722a, 723a and 724a present on this path. The constraints 721a, 723a and 724a are constraints of the "AT" type, whereas constraints 720a and 722a are of the "WINDOW" type.

The points "1", "2", "3", "L" (signifying "clean") and "F" represent the successive points at which the aerodynamic configuration is changed, with extension of actuators of the slat, flap or landing gear type intended to alter the total energy or the mechanical energy dissipated by the aircraft.

FIG. 7b depicts an example of displaying a vertical path according to the invention on an equipment of the EFB type. This display is given by way of example and can be used separately or jointly with the display 7a. The display 7b notably comprises a display of the vertical path with the associated altitude constraints 710b, display of the evolution of the speed as a function of distance within the possible speeds evolution envelope 720b, and the evolution of the performance criteria associated with the limits assigned to these 730b. This display allows the pilot, for each of the flight performance criteria, to verify at each waypoint whether the criterion is easily validated, just validated or not validated. The means to be used to guarantee a flyable profile may also be displayed in overlay on the display 7b.

FIG. 7c depicts one example of the displaying of a vertical path segment on equipment of VD type, and can be used separately or jointly with the display modes 7a and 7b. This example of a display comprises the display 700c of the ground gradient of the flight segment being studied, and the limit ground gradients 710c, 711c and 712c respectively associated with three performance criteria. A display of this type allows an aircraft pilot to identify the margins of safety in respect of various criteria.

These display means are given by way of example. Other means of displaying the paths obtained are also possible, notably when the aircraft flight path is calculated on the ground and transmitted to the aircraft.

Figure 8A:
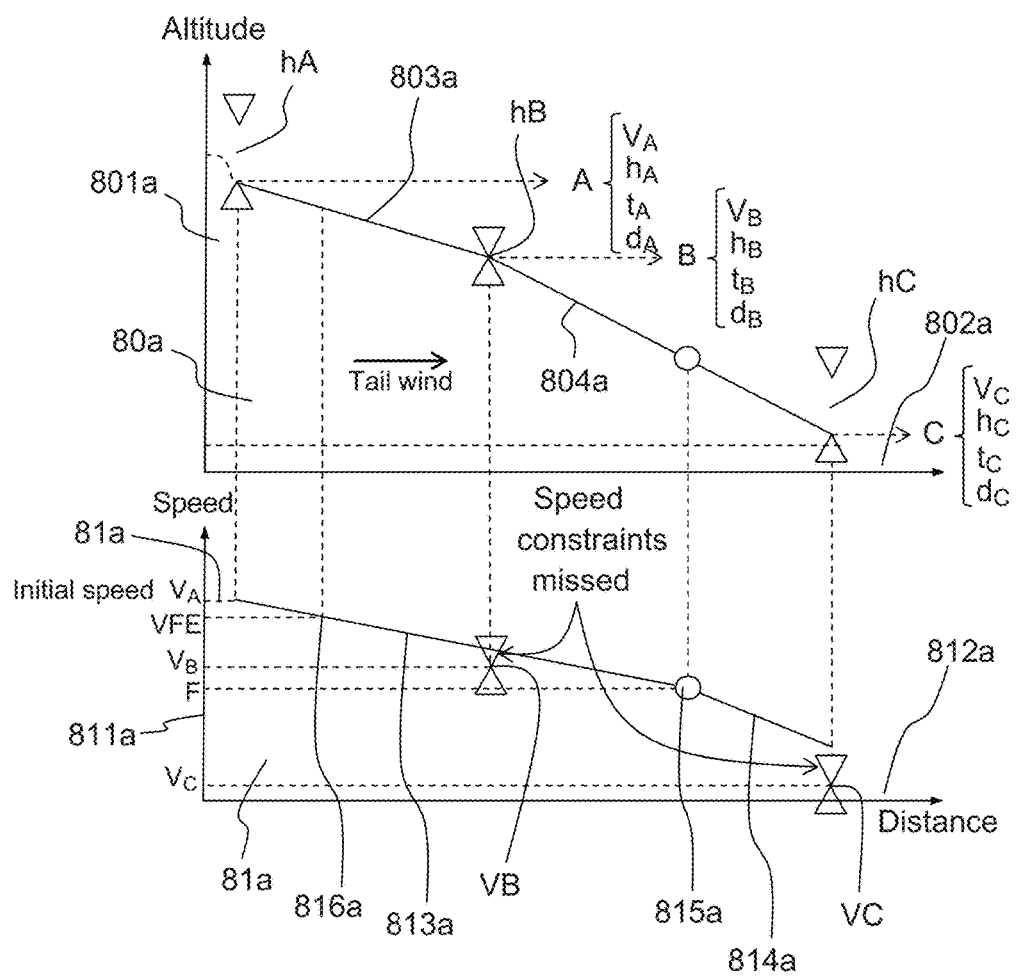
FIGS. 8a, 8b and 8c: respectively an example of a vertical path comprising two speed constraints that have been missed as a result of an unexpected tail wind; a vertical path comprising flight segments that have been modified according to the invention in order to meet the first constraint; a vertical path comprising flight segments that have been modified according to the invention in order to meet both the first and the second constraint.
Figure 8B:
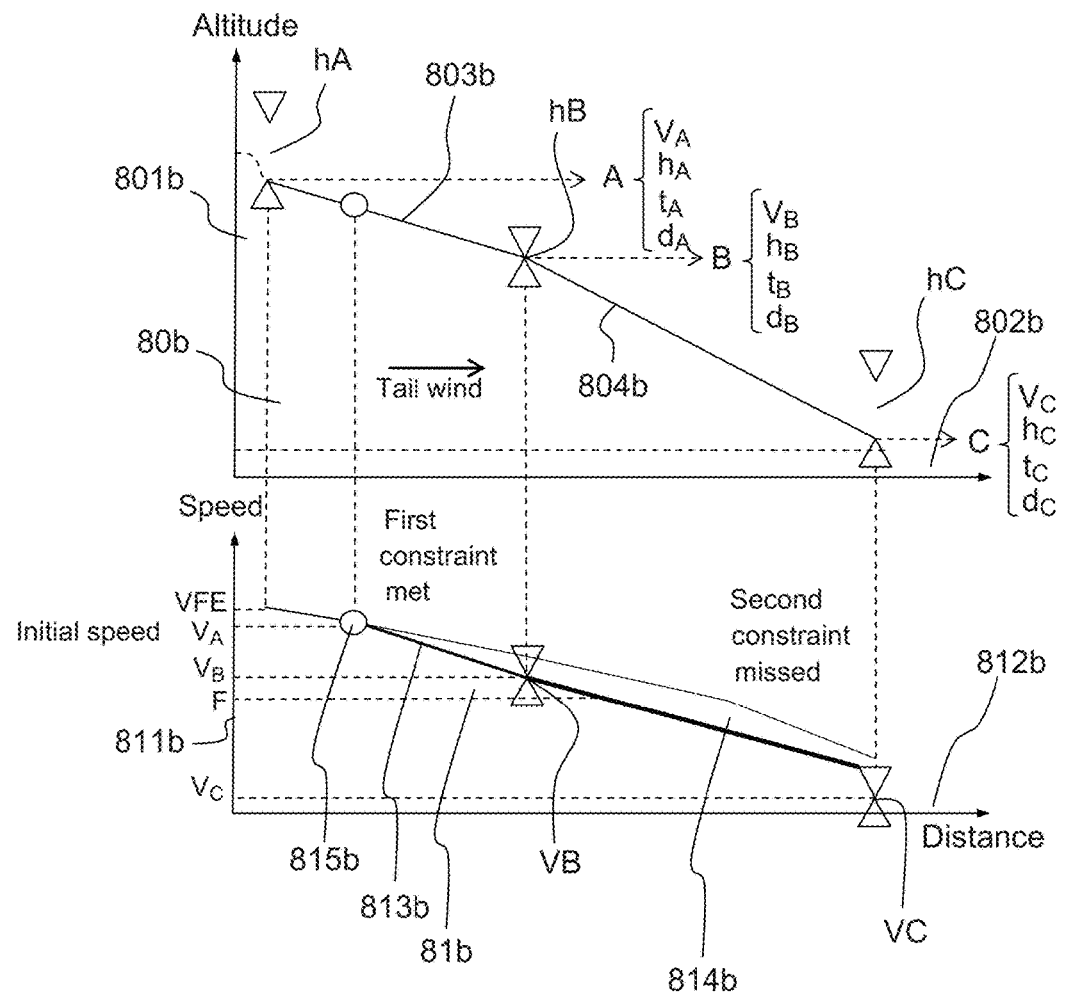
Figure 8C:
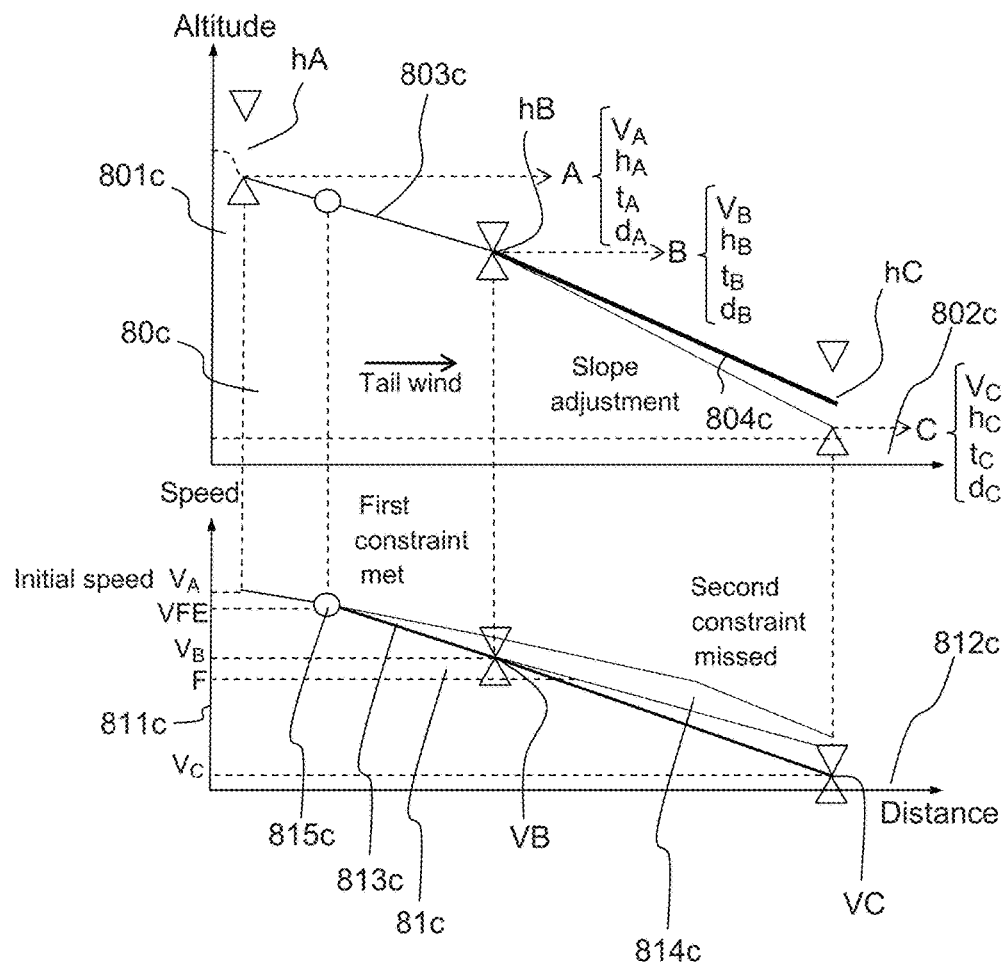

FIGS. 8a, 8b and 8c respectively depict an example of a vertical path comprising two speed constraints that have been missed as a result of an unexpected tail wind; a vertical path comprising flight segments modified according to the invention in order to meet the first constraint; a vertical path comprising flight segments modified according to the invention to meet both the first and the second constraint.

These figures are given by way of nonlimiting example of how two segments of vertical path are adapted by a method according to the invention. In this example, an aircraft in the landing phase following a CDA procedure with altitude and speed constraints is confronted by an unexpected tail wind, because of which it does not comply with its speed constraints. FIG. 8a represents a vertical approach profile of the aircraft, for altitude and speed. The graph 80a represents the altitude profile for this descent, namely how the altitude of the aircraft evolves as a function of the distance covered. This graph has a vertical axis 801a indicating the altitude of the aircraft and a horizontal axis 802a representing the distance covered. The graph 81a represents how the speed of the aircraft evolves as a function of the distance covered. It comprises a vertical axis 811a indicating the speed of the aircraft and a horizontal axis 812a indicating the distance covered. The vertical path has two segments 803a and 804a, constrained by 3 points A, B and C. Each point A, B and C is associated with altitude constraints $h_A$, $h_B$ and $h_C$ respectively. Points B and C are associated with speed constraints $V_B$ and $V_C$. The altitude constraints hA and hC are of the "WINDOW" type whereas the constraint hB is of the "AT" type.

The axis 812a represents the distance with respect to the current position of the aircraft, while the axis 811a represents the speed of the aircraft at the point in question. The points VB and VC represent the speed constraints of the points B and C. FIG. 8a as a whole therefore represents the descent and progressive deceleration of the aircraft until it lands.

At point A, the aircraft is in the following state: engine thrust IDLE (minimal); aerodynamic configuration 2 (slats and flaps deployed); landing gear down; no air brake. The point 815a represents the estimated point of deploying an aerodynamic configuration 3, intended for landing, involving a greater extension of the slats and flaps. As a result of an unexpected tail wind, the aircraft is no longer capable of meeting the speed constraints VB and VC: the speed segments 813a and 814a are located above the constraints VB and VC in FIG. 8a.

A method according to the invention is therefore used to adapt the two flight segments 803a and 804a in order to meet all the altitude and speed constraints. First of all, the method is applied to flight segment 803a in order to validate the speed constraint VB. A single criterion associated with deceleration is applied at point A, for which the capacity to decelerate is given by:

$$\left(\frac{dCAS}{dt}\right)_A = \frac{CAS_B - CAS_A}{t_B - t_A}$$

where $$\left(\frac{dCAS}{dt}\right)_A$$

represents the deceleration at point A, $CAS_B$ the air speed constraint at point B, $CAS_A$ the initial speed at point A, $t_B$, the time of crossing point B and $t_A$ the time of crossing point A. Because the capacity of the aircraft to decelerate is insufficient for maintaining the initially predicted gradient with the tail wind, the limit gradient calculated for this performance criterion in step 410 is smaller, in absolute value, than the initially intended gradient for the flight segment 803*a*. The performance criterion adopted is therefore not validated in step 420.

In step 430, the method verifies whether a command is possible for validating the performance criterion. In its initial configuration the aircraft decelerates below the speed referred to as VFE (or Flaps Extended Speed), connected with configuration 3 at point 816*a*. This speed represents a maximum speed in the high-lift position connected with configuration 3, namely the maximum speed below which configuration 3 can be used. Because point 816*a* falls within the flight segment 803*a*, it is possible to apply a flight command to switch to configuration 3 from this point onward. Step 430 therefore identifies a capacity to apply a flight command within flight segment 803*a* in order to switch to configuration 3. It is possible, iteratively, to determine the optimum moment for switching to configuration 3 from point B. In this particular instance, this moment corresponds to the passing through VFE connected with configuration 3, at the point 816*a*.

The prediction for executing the command to switch to configuration 3 is performed in step 440, then a new limit gradient is calculated in step 410, taking the new capacity of the aircraft to decelerate into consideration. This gradient is equal to that of the flight segment 803*a*, the performance criterion is therefore validated in step 420 and the flight segment 803*a* including early passage to configuration 3 validated.

FIG. 8*b* represents the predicted path following adaptation of the flight segment 803*a*. The altitude profile 80*b* and speed profile 81*b* are organized with the same axes as the profiles 80*a* and 81*a*; the axis 801*b* represents the altitude of the aircraft, the axis 811*b* its speed, and the axes 802*b* and 812*b* the distance covered by the aircraft from its current position. The flight segments 803*b* and 804*b* correspond to the segments 803*a* and 804*a* which have been adapted.

After anticipating the passage to aerodynamic configuration 3 at point 815*b*, the speed profile 813*b* in the first flight segment 803*b* decelerates more rapidly. The speed constraint VB is thus met. By contrast, the second speed constraint VC at the end of the second flight segment 804*b* is not respected because the speed profile 814*b* shows too high a speed at this point.

A method according to the invention is therefore applied to the second segment 814*b*, maintaining a performance criterion regarding the capacity of the aircraft to decelerate. In step 410, a limit ground gradient is calculated with respect to the deceleration needed in order to pass from the speed constraint VB to the speed constraint VC in a time $(t_C - t_B)$. The gradient obtained is smaller, in absolute value, than the effective gradient of segment 804*b*. The performance criterion is therefore not validated in step 420.

In step 430, no flight command that would allow the capacity of the aircraft to decelerate to be increased has been identified: the engine thrust is already at the low "IDLE" speed; air brakes are forbidden because they cause too much vibration, and the aerodynamic configuration of the aircraft, already at its maximum configuration, can no longer change.

Step 450 of the method is therefore activated in an attempt to modify one of the initial and final points of the segment. In the context of the segment 804*b*, the altitude at point B is fixed by continuity with the previous segment. The limit gradient calculated in step 410 is therefore applied to segment 804*b*, from point B onwards, this in particular making it possible to increase the altitude of the aircraft at point C. The set of altitude constraints present on this segment are then evaluated. The altitude constraint hB is still verified and the constraint hC, of the "WINDOW" type, allows the altitude of point C to be adjusted enough to validate the adaptation made to the flight segment.

FIG. 8*c* represents the vertical path at the end of the method. The altitude profile 80*c* and speed profile 81*c* are organized along the same axes as the profiles 80*b* and 81*b*: the axis 801*c* represents the altitude of the aircraft, the axis 811*c* its speed, and the axes 802*c* and 812*c* the distance covered by the aircraft from its current position. The flight segments 803*c* and 804*c* correspond to the segments 803*b* and 804*b* adapted.

In this final path, all of the constraints hA, hB, hC, VB and VC are met. The capacity to decelerate 814*c* allowing deceleration from speed VB to speed VC has been able to be obtained by adapting the gradient of the flight segment 804*b* so as to obtain the segment 804*c*, the constraint hC being of the "WINDOW" type, the altitude constraint hC nevertheless still being respected.

The examples above demonstrate the capacity of a method according to the invention to adapt and optimize flight segments with constant gradient. They are, however, given merely by way of example and do not in any way limit the scope of the invention, which is defined in the claims hereinbelow.

The invention claimed is:

1. A method for adapting an aircraft descent segment with constant ground gradient for optimizing said aircraft descent segment with respect to at least two performance criteria, executed by a flight management system, comprising:
    acquiring state variables characterizing the aircraft, environment variables characterizing the environment thereof and path variables characterizing a predicted path thereof at one of an initial and a final point of the aircraft descent segment;
    calculating at least two limit ground gradients for said at least two performance criteria from the said state variables, the said environment variables and the said path variables;
    validating the path initially predicted against a most restrictive limit ground gradient among said at least two limit ground gradients for at least two performance criteria;
    and when the path initially predicted is not valid:
        checking a feasibility of a command to modify at least one state variable;
        if feasibility is verified, predicting an execution of the said command;
        otherwise, predicting a modification of one of the initial and final points of the segment with respect to constraints of the flight plan; and at least one of the following further steps of: sending said aircraft descent segment to an automatic pilot or displaying said aircraft descent segment to a pilot,
wherein the step of calculating at least two limit ground gradients for at least two performance criteria comprises calculating a limit air gradient for each of said at least two performance criteria, said step of calculating the limit air gradient comprising:
calculating an engine thrust resultant;
setting the limit air gradient to a default value;
calculating an aerodynamic drag resultant as a function of the limit air gradient and the state variables of the aircraft; and
calculating the limit air gradient as a function of the aerodynamic drag resultant, the aircraft state variables and the engine thrust resultant, said step of calculating the aerodynamic drag resultant and the step of calculating the limit air gradient being performed iteratively until a stop criterion is satisfied, said stop criterion being satisfied when an angular difference between the limit air gradient and a limit air gradient obtained in an immediately preceding iteration is, in absolute value, below a predefined threshold.

2. The method of claim 1, wherein the predefined threshold is 0.001°.

3. The method of claim 1, comprising at least one performance criterion in relation to the deceleration capacity of the aircraft.

4. The method of claim 1, wherein the step of checking the feasibility of a command to modify at least one state variable involves successively verifying the feasibility of one or more commands of an actuator for modifying a capacity to dissipate a total or a mechanical energy of the aircraft.

5. The method of claim 4, comprising successively verifying:
a command to reduce an engine thrust;
a command to extend slats and flaps;
a command to deploy a landing gear;
a command to extend air brakes.

6. The method of claim 1, comprising presenting the obtained vertical path to a pilot.

7. The method of claim 1, comprising, when the flight plan constraints do not permit the modification of any of the initial and final points of the segment, displaying or emitting a cockpit warning.

8. An aircraft flight management computing device configured to adapt an aircraft descent segment with constant ground gradient for optimizing said aircraft descent segment with respect to at least two performance criteria, comprising: a data link configured to acquire state variables characterizing the aircraft, environment variables characterizing the environment thereof and path variables characterizing a predicted path thereof at one of an initial and a final point of the segment; a processor configured to: calculate at least two limit ground gradients for said at least two performance criteria from the said state variables, the said environment variables and the said path variables; validate the path initially predicted against a most restrictive limit ground gradient among said at least two limit ground gradients for at least two performance criteria; and when the path initially predicted is not valid: check a feasibility of a command to modify at least one state variable; if feasibility is verified, predict an execution of the said command; otherwise, predict the modification of one of the initial and final points of the segment with respect to constraints of the flight plan; and said processor being further configured to perform at least one of the following: sending said aircraft descent segment to an automatic pilot or displaying said aircraft descent segment to a pilot.

9. A computer program stored on a non transient computer readable medium, configured to adapt an aircraft descent segment with constant ground gradient for optimizing said aircraft descent segment with respect to at least wo performance criteria, the said program comprising;
computer code elements configured to carry out an acquisition of state variables characterizing the aircraft, of environment variables characterizing the environment thereof, and of path variables characterizing a predicted path thereof at one of an initial and a final point of the segment;
computer code elements configured to perform a calculation using the said state variables, the said environment variables and the said path variables of at least two limit ground gradients for said at least two performance criterion;
computer code elements configured to verify the validity of the path initially predicted with respect to a most restrictive limit ground gradient among said at least two limit ground gradients for at least two performance criteria;
computer code elements configured to perform the following operations when the path initially predicted is not valid:
check a feasibility of a command to modify at least one state variable;
if feasibility is verified, predict an execution of the said command;
otherwise, predict a modification of one of the initial and final points of the segment, with respect to constraints of the flight plan; and
said computer program further comprising computer code elements configured to at least one of the following: sending said aircraft descent segment to an automatic pilot or displaying said aircraft descent segment to a pilot,
wherein said calculation of at least two limit ground gradients for at least two performance criteria, comprises a calculation of a limit air gradient for each of said at least two performance criteria, said calculation of the limit air gradient comprising:
calculating an engine thrust resultant;
setting the limit air gradient to a default value;
calculating an aerodynamic drag resultant as a function of the limit air gradient and the state variables of the aircraft; and
performing a calculation of the limit air gradient as a function of the aerodynamic drag resultant, the aircraft state variables and the engine thrust resultant, said calculation of the aerodynamic drag resultant and calculation of the limit air gradient being performed iteratively until a stop criterion is satisfied, said stop criterion being satisfied when an angular difference between the limit air gradient and a limit air gradient obtained in an immediately preceding iteration is, in absolute value, below a predefined threshold.

* * * * *